United States Patent [19]

Kawamoto et al.

[11] Patent Number: 5,395,869

[45] Date of Patent: Mar. 7, 1995

[54] THERMALLY STABILIZED THERMOPLASTIC CYCLOOLEFIN IN RESIN COMPOSITIONS

[75] Inventors: Keiji Kawamoto; Tetsuji Kasai; Hideki Sakai, all of Kuga, Japan

[73] Assignee: Mitsui Petrochemical Industries, Ltd., Tokyo, Japan

[21] Appl. No.: 225,935

[22] Filed: Apr. 11, 1994

Related U.S. Application Data

[63] Continuation of Ser. No. 28,620, Mar. 8, 1993, abandoned, which is a continuation of Ser. No. 731,365, Jul. 16, 1991, abandoned, which is a continuation of Ser. No. 571,531, Aug. 28, 1990, abandoned.

[30] Foreign Application Priority Data

| Jan. 12, 1989 | [JP] | Japan | 1-5454 |
| Jan. 12, 1989 | [JP] | Japan | 1-5455 |
| Jan. 12, 1989 | [JP] | Japan | 1-5456 |
| Jan. 12, 1989 | [JP] | Japan | 1-5460 |
| Jan. 12, 1989 | [JP] | Japan | 1-5461 |
| Jan. 12, 1989 | [JP] | Japan | 1-5559 |

[51] Int. Cl.$^6$ .......................... C08K 5/13; C08K 5/15
[52] U.S. Cl. ............................. 524/108; 524/339; 524/343; 524/349; 524/350; 524/399
[58] Field of Search ............... 524/108, 350, 349, 343, 524/339, 399

[56] References Cited

U.S. PATENT DOCUMENTS

| 3,991,139 | 11/1976 | Kokuryo | 524/151 |
| 4,138,536 | 2/1979 | Hsieh | 526/19 |
| 4,576,734 | 3/1986 | Ishii et al. | 524/108 |
| 4,598,102 | 7/1986 | Leach | 524/289 |
| 4,822,839 | 4/1989 | Paisner | 524/349 |
| 4,829,112 | 5/1989 | Ishii et al. | 524/108 |
| 4,874,808 | 10/1989 | Minami et al. | 524/291 |
| 4,918,133 | 4/1990 | Moriya et al. | |
| 5,278,214 | 1/1994 | Moriya et al. | 524/238 |

FOREIGN PATENT DOCUMENTS

| 0203799 | 12/1986 | European Pat. Off. |
| 0291208 | 11/1988 | European Pat. Off. |
| 2731445 | 2/1978 | Germany . |
| 62-173226 | 7/1987 | Japan . |
| 63-273655 | 11/1988 | Japan . |
| 63-275654 | 11/1988 | Japan . |

*Primary Examiner*—Veronica P. Hoke
*Attorney, Agent, or Firm*—Sherman and Shalloway

[57] ABSTRACT

The cycloolefin resin compositions of the present invention comprise a thermoplastic resin containing an olefin polymer having an alicyclic structure, specific stabilizers selected from phenolic stabilizers, organic thioether stabilizers, organic phosphite stabilizers, UV-ray absorbers and hindered amine stabilizers. The cycloolefin resin compositions show excellent thermal aging resistance and weathering resistance by the use of specific stabilizers, and therefore they are favorably used for forming optical instrument parts. Furthermore, the thermoplastic resin may be prepared from an olefin polymer having an alicyclic structure and a flexible polymer or flexible polymers. The incorporation of the flexible polymer especially improves the mechanical strength of the resultant products, and therefore the resin compositions are favorably used for machine parts, electronic parts, automobile parts, etc.

5 Claims, No Drawings

THERMALLY STABILIZED THERMOPLASTIC CYCLOOLEFIN IN RESIN COMPOSITIONS

This application is a continuation of prior application Ser. No. 08/028,620, filed Mar. 8, 1993, now abandoned, which in turn is a continuation of application Ser. No. 07/731,365, filed Jul. 16, 1991, now abandoned, which in turn is a continuation of application Ser. No. 07/571,531, filed Aug. 28, 1990, now abandoned.

FIELD OF THE INVENTION

The present invention relates to cycloolefin resin compositions having excellent thermal aging resistance and weathering resistance as well as excellent heat resistance, chemical resistance, solvent resistance, dielectric characteristics, rigidity characteristics, dimension stability and impact resistance. The present invention further relates to cycloolefin resin compositions suitable for producing resin molded products having high transparency such as optical instrument parts.

BACKGROUND OF THE INVENTION

Polyolefin resins which are widely used as general purpose resins are excellent in heat resistance, solvent resistance and dielectric characteristics. After further improving the heat resistance, rigidity, dimension stability, impact resistance, etc. of the polyolefin resins having such excellent characteristics, the present inventors once proposed novel Cycloolefin random copolymers (for example, in Japanese Patent L-O-P Nos. 168708/1985 and 120816/1986) having alicyclic structures, and prepared from ethylene and bulky cycloolefins. The inventors further proposed a method for blending the cycloolefin random copolymers with specific polymers (for example, Japanese: Patent L-O-P Nos. 163236/1989 and 163241/1989) to improve the impact resistance of the cycloolefin random copolymers. Though these resin compositions have excellent characteristics under ordinary using conditions, the resin compositions tend to be oxidized under severe conditions at alicyclic structures, that is, the constituent units derived from cycloolefins, because the main component of the resin compositions is an olefin resin having an alicyclic structure. Such resin compositions gradually deteriorate in their excellent characteristics that alicyclic structure olefin resins such as cycloolefin random copolymers have as inherent properties when exposed to an environment at high temperature over a long period of time. The resin compositions also tend to be deteriorated when irradiated with such light having a short wavelength as an UV-ray, and show lowering of physical properties when exposed to sunlight in the open air over a long period.

Synthetic resins are often used for manufacturing optical instrument parts such as optical lenses, optical disc substrates and optical fibers in place of conventionally used glass.

It is desirable that optical instrument parts manufactured from such synthetic resins have high transparency, rigidity and impact resistance.

As the resins having such excellent properties, there have been conventionally used transparent resins such as polymethacrylate, polycarbonate and poly-4-methylpentene-1, but the present inventors have found that olefin resins having an alicyclic structure such as thermoplastic resins containing a random copolymer of chain olefin (e.g., ethylene) and cycloolefin are basically suitable for producing optical parts. For example, optical parts such as plastic lenses or substrates of optical discs can be produced by molding the above-mentioned random copolymer of chain olefin and cycloolefin through injection molding. Further, optical fibers can be produced by molding the random copolymer through extrusion molding. The optical instrument parts produced as mentioned above show high rigidity and high resistance to shocks in addition to the high transparency.

In the case of producing molded products having specific shapes by the above-mentioned molding method, the resin used therefor is desired to have a low viscosity, and the viscosity of the resin is generally made lower by raising a temperature of the resin. Especially when a molded product of small thickness is formed through injection molding, the resin is compelled to stay in the molding machine for a long period of time, and therefore the resin is also heated for a long period of time. Further, when the resin passes through a narrow part of a mold to produce a molded product of small thickness, a mechanical shearing force is applied to the resin, sometimes the molding resulting in local generation of heat in the resin.

On the other hand, in the case of producing filaments by extrusion molding, high speed spinning is desirably carried out from the viewpoint of increasing productivity, and for such a high speed spinning, it is desired to raise a temperature of the resin to lower the viscosity thereof. Further, when the high speed spinning is carried out, a mechanical shearing force is likely to be applied to the resin.

Owing to the above-mentioned external heating of the resin or generation of heat within the resin caused by the mechanical shearing force or the like, the resin is exposed to high temperatures for a long period of time during molding, and thereby the resin is apt to be thermally decomposed or thermally deteriorated during molding. As a result, the resulting molded product is colored and reduces its transparency.

For preventing the thermal decomposition or thermal deterioration of the resin during molding, a heat-resistant stabilizer is generally incorporated into the resin. This method is effective for the production of known resin molded products. The resin can be prevented from thermal decomposition or thermal deterioration occurring during molding by using this method, and consequently the obtained molded product can be also prevented from coloring or lowering of the transparency required to a satisfactory degree for conventional resin molded products.

However, in the field such as the optical one where very high transparency is required for the parts, transparency of molded products becomes a very important factor. Accordingly even when the above-mentioned conventional method is employed for preventing thermal decomposition or thermal deterioration of the resin, the resulting molded product tends to be colored because of slight burning of the resin taking place in the heating stage. Further, the stabilizer contained in the resin becomes per sea colored oxide, and the colored oxide also colors the resulting molded product, that is, the final optical part reduces its transparency. Moreover, the thermal decomposition or the thermal deterioration of the resin during molding sometimes brings about extremely small-sized voids within the resulting molded product, and hence optical instrument parts having excellent optical properties cannot be produced.

The present inventors have also found that since a random copolymer of chain olefin and cycloolefin has an alicyclic structure portion in its molecule, conjugated double bonds are easily formed by the thermal decomposition or the like in this portion, and that the random copolymer having such features is more easily colored as compared with general polyolefins. In addition, formation of such conjugated double bonds lowers a transmittance of light in the short wavelength region, resulting in lowering the optical properties in the visible region of the random copolymer and restricting the use of the final optical parts.

The present inventors have made various proposals with respect to additives capable of preventing thermal decomposition or thermal deterioration in such resin molded products requiring high transparency as optical instrument parts.

For example, there are
an optical transparent substrate produced by adding two or more kinds of phenolic oxides having a $\beta$-(3,5-di-tert-butyl-4-hydroxyphenyl)propionyl group to a transparent thermoplastic resin, as described in Japanese Patent L-O-P No. 14101/1988;

an optical transparent substrate produced by adding $\beta$-(3,5-di-tert-butyl-4-hydroxyphenyl)alkylpropionate in which the alkyl group forming an ester part has up to 10 carbon atoms to a transparent thermoplastic resin, as described in Japanese Patent L-O-P No. 15201/1988;

an optical transparent substrate produced by adding a phenolic antioxidant having a cycloalkyl group to a transparent thermoplastic resin, as described in Japanese Patent L-O-P No. 23101/1988; and an optical disc having a substrate produced by adding a phenolic antioxidant and an ester of an aliphatic acid with a polyol in which a portion of hydroxyl groups of a tri- or more-valent polyol is esterified to a thermoplastic resin, as described in Japanese Patent L-O-P No. 110630/1988.

The above-mentioned phenolic antioxidants show high antioxidizing effects on polyolefins or random copolymers of chain olefin and cycloolefin, and consequently the substrates of optical discs produced by adding such antioxidants to the thermoplastic resin have high transparency.

Japanese Patent L-O-P No. 173226/1987 discloses that a transparent thermoplastic resin containing bis(-dialkylphenyl) pentaerythritol diphosphite ester is molded to form a transparent substrate through injection molding.

However, optical instrument parts such as optical lenses and optical fibers need much higher transparency than the above-mentioned optical disc substrates, and therefore even when the phenolic antioxidants or antioxidizing techniques described in those publications are utilized, it has proved that there cannot be obtained optical lenses or optical fibers having much higher transparency.

As described above, the optical parts such as optical lenses and optical fibers requiring high transparency can be hardly produced even by incorporating known stabilizers into such olefin polymers having an alicyclic structure as random copolymers of chain olefins and cycloolefins.

Moreover, when such a catalyst containing chlorine atoms as Ziegler catalyst is employed for producing such olefin polymers having an alicyclic structure as random copolymers of chain olefins and cycloolefins, the catalyst containing chlorine atoms sometimes remains in the resulting copolymers. The remaining catalyst component decomposes to give a chlorine gas during molding, and the molding machine is likely to be corroded owing to the chlorine gas. When the molding machine is corroded, rust is easily introduced into the resin to color the resulting optical parts and to lower the transparency thereof.

The present invention intends to solve the above-mentioned problems with regard to prior art, and an object of the invention is to provide resin compositions having excellent thermal aging resistance and weathering resistance as well as excellent heat resistance, chemical resistance, dielectric characteristics, rigidity and dimension stability.

Another object of the invention is to provide resins which neither are colored, nor form fish-eyes, agglomerates of the resin and foams during forming molded resin products requiring transparency such as optical instruments parts and which are capable of giving resin molded products having high transparency.

A further object of the invention is to provide resin compositions capable of producing resin molded products without coloring, without forming fish-eyes, resin agglomerates and foams, and without lowering transparency, even when a thermoplastic resin obtained by using such a catalyst containing chlorine atoms as Ziegler catalyst is employed.

A still further object of the invention is to provide resin compositions having excellent thermal aging resistance and weathering resistance for industrial use other than optical use.

DISCLOSURE OF THE INVENTION

A first cycloolefin resin composition according to the invention comprises a thermoplastic resin containing at least 50% by weight of an olefin polymer having an alicyclic structure, 0.01–5 parts by weight of a phenolic stabilizer and 0.01–5 parts by weight of an organic thioether stabilizer based on 100 parts by weight of the thermoplastic resin.

A second cycloolefin resin composition according to the invention comprises a thermoplastic resin containing at least 50% by weight of an olefin polymer having an alicyclic structure, 0.01–5 parts by weight of a phenolic stabilizer and 0.01–5 parts by weight of an organic phosphite stabilizer excluding a phosphite compound derived from pentaerythritol based on 100 parts by weight of the thermoplastic resin.

A third cycloolefin resin composition according to the invention comprises a thermoplastic resin containing at least 50% by weight of an olefin polymer having an alicyclic structure, 0.01–5 parts by weight of a phenolic stabilizer, 0.01–5 parts by weight of an organic phosphite stabilizer and 0.01–5 parts by weight of an organic thioether stabilizer based on 100 parts by weight of the thermoplastic resin.

A fourth cycloolefin resin composition according to the invention comprises a thermoplastic resin containing at least 50% by weight of an olefin polymer having an alicyclic structure and 0.01–5 parts by weight of a compound or compounds based on 100 parts by weight of the thermoplastic resin, said compound(s) being represented by the formula [A] and/or [B] and having a molecular weight of not more than 600:

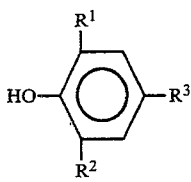
[A]

wherein each of R¹ and R² independently represents a hydrogen atom or an alkyl group having 1-6 carbon atoms, R³ represents a group selected from the group consisting of an alkyl group having 1-22 carbon atoms, an alkoxy group having 1-6 carbon atoms and an alkylamino group having 1-6 carbon atoms;

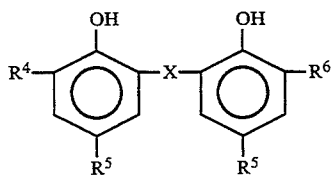
[B]

wherein each of R⁴ and R⁶ independently represents an alkyl group having 1-6 carbon atoms, R⁵ represents an alkyl group having 1-6 carbon atoms or an alkoxy group having 1-6 carbon atoms, and X represents an atom or a group selected from the group consisting of an alkylene group, an oxygen atom and a sulfur atom.

A fifth cycloolefin resin composition according to the invention comprises a thermoplastic resin containing at least by weight of an olefin polymer having an alicyclic structure and 0.01-5 parts by weight of a compound or compounds based on 100 parts by weight of the thermoplastic resin, said compound or compounds being represented by the formula [C]:

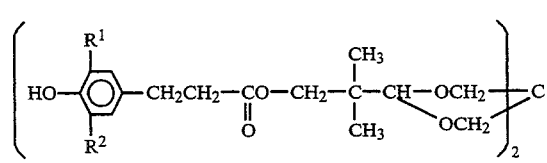
[C]

wherein each of R¹ and R² independently represents an alkyl group having 1-6 carbon atoms.

A sixth cycloolefin resin composition according to the invention comprises a thermoplastic resin containing at least 50% by weight of an olefin polymer having an alicyclic structure, 0.01-5 parts by weight of a dialkyl thiodipropionate and/or an ester compound of an alkylthiopropionic acid with a polyol and 0.01-5 parts by weight of an organic phosphite stabilizer based on 100 parts by weight of the thermoplastic resin.

Each of the above-mentioned first to sixth cycloolefin resin compositions according to the invention may further contain 0.01-5 parts by weight of a metal salt of a higher aliphatic acid (i.e., higher aliphatic acid metal salt) based on 100 parts by weight of the thermoplastic resin (seventh cycloolefin resin composition).

Each of the above-mentioned first to seventh cycloolefin compositions according to the invention may further contain parts by weight of the thermoplastic resin (eighth cycloolefin resin composition).

Furthermore, the thermoplastic resin which the first to eighth cycloolefin resin compositions comprise may also comprise a specific flexible polymer in addition to the cycloolefin polymer having an alicyclic structure.

There can be provided resin compositions from which molded products having very high mechanical strength can be manufactured by such incorporation of the flexible polymer.

Since the cycloolefin resin compositions of the invention contain stabilizers as described above, the resin is hardly burned during molding, and tends not to have conjugated double bonds formed by oxidation of the alicyclic structure within the molecule of the olefin polymer. The resin compositions show a lower degree of deterioration of the physical properties thereof even when exposed to sunlight over a long period. Accordingly, when the resin composition of the invention is used for producing such a molded product requiring high transparency as an optical instrument part, the obtained molded product is almost free from being colored, and in addition the transparency inherent to the thermoplastic resin composition containing an olefin polymer having an alicyclic structure is not impaired during molding.

Moreover, even in the case of using a thermoplastic resin containing a resin prepared by using such a catalyst containing chlorine atoms as Ziegler catalyst, rust is not formed in the molding machine. Accordingly, by using the containing chlorine atoms as Ziegler catalyst, rust is not formed in the molding machine. Accordingly, by using the resin compositions of the invention, there can be prevented coloring and lowering of transparency of optical instrument parts caused by introduction of rust into the resin.

DETAILED DESCRIPTION OF THE INVENTION

The cycloolefin resin compositions of the present invention are described in detail hereinafter.

First, the first cycloolefin resin composition of the invention is illustrated below.

The first cycloolefin resin composition comprises a thermoplastic resin containing an olefin polymer having an alicyclic structure, a specific amount of a phenolic stabilizer and a specific amount of an organic thioether stabilizer.

The resin which the cycloolefin resin compositions of the invention comprise is a thermoplastic resin containing an olefin polymer having an alicyclic structure.

The olefin polymers having an alicyclic structure can be prepared, for example, by copolymerizing an olefin with a cycloolefin having the following formula [I]in a liquid phase in the presence of a catalyst:

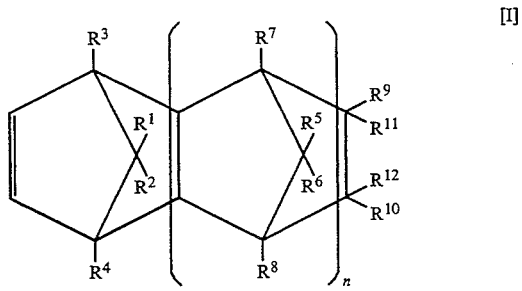
[I]

wherein n is an integer of at least 0, each of R¹ to R¹² independently represents a hydrogen atom, a halogen atom or a hydrocarbon group, R⁹ to R¹² may be bonded together to form a monocyclic group or a polycyclic group, the monocyclic group or the polycyclic group may have a crosslinking structure and may further have double bond(s), and $R^9$ to $R^{12}$ may form a group containing these rings in combination.

In other words, $R^9$ to $R^{12}$ may form a polycyclic group or a monocyclic group in combination as described below.

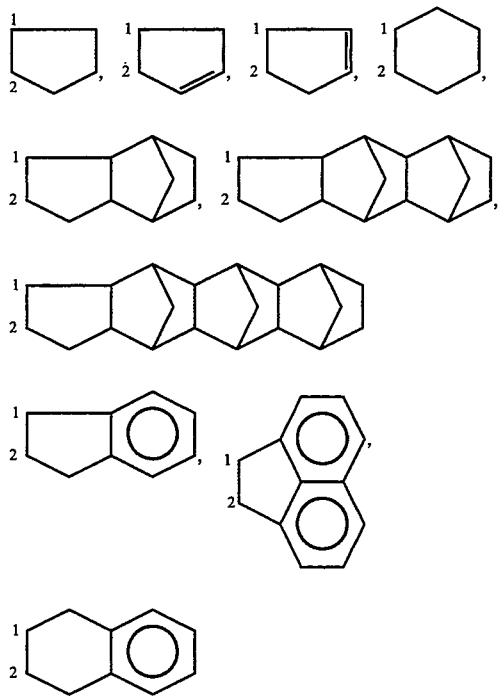

The carbon atoms indicated by 1 and 2 in the above-exemplified formulas represent carbon atoms of an alicyclic structure in the formula [I], wherein groups designated by $R^9$ to $R^{12}$ are bonded to the carbon atoms. Further, these groups may have substituting groups such as a methyl group.

Moreover, $R^9$ and $R^{11}$ (or $R^{10}$ and $R^{12}$), when taken together, may form an alkylidene group. Furthermore, each of $R^9$ to $R^{12}$ may have an ester group.

As preferred examples of such cycloolefins, there can be mentioned cycloolefins having the following formula [II]:

wherein n is 0 or 1, m is an integer of at least 0, each of $R^1$ to $R^{18}$ independently represents an atom or a group selected from the group consisting of a hydrogen atom, a halogen atom and a hydrocarbon group, $R^{15}$ to $R^{18}$ may be bonded together to form a monocyclic group of a polycyclic group, the monocyclic group or the polycyclic group may have double bond(s), and $R^{15}$ and $R^{16}$ or $R^{17}$ and $R^{18}$ may form an alkylidene group;

Moreover, a cycloolefin used as raw material for preparing the olefin polymer having an alicyclic structure of the present invention includes compounds represented by the following formula [II-a]:

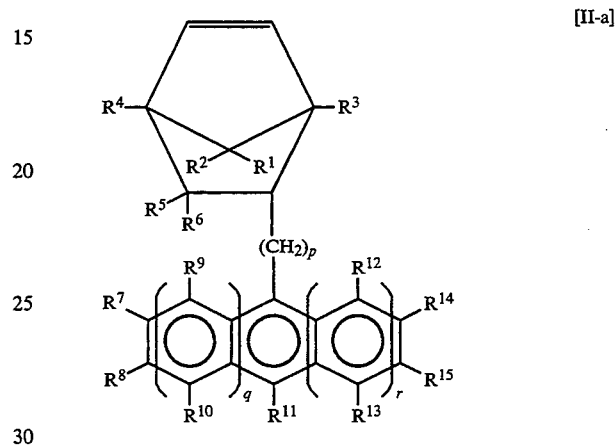

wherein p is an integer of at least 0, q and r are each 0, 1 or 2, each of $R^1$ to $R^{15}$ independently represents an atom or a group selected from the group consisting of a hydrogen atom, a halogen atom, an aliphatic hydrocarbon group, an aromatic hydrocarbon group and an alkoxy group, $R^5$ (or $R^6$) and $R^9$ (or $R^7$) may be bonded together directly or through an alkyl group of 1-3 carbon atoms.

Furthermore, the olefin polymer having an alicyclic structure may also be obtained from a cyclic olefin represented by the formula [I], preferably [II] or [II-a] singly or in combination by ring opening polymerization or copolymerization. Furthermore, in the present invention, there may also be used hydrogen-added products prepared by at least partially hydrogenating the double bond of the above-described ring opening polymerization polymer or copolymer.

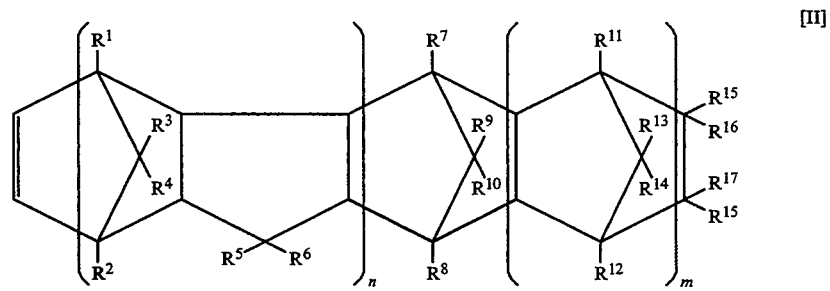

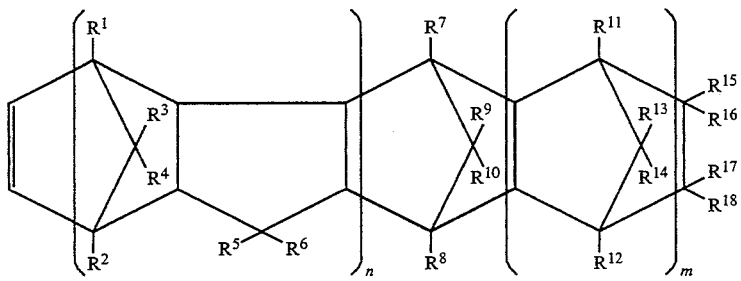

Ring opening polymerization

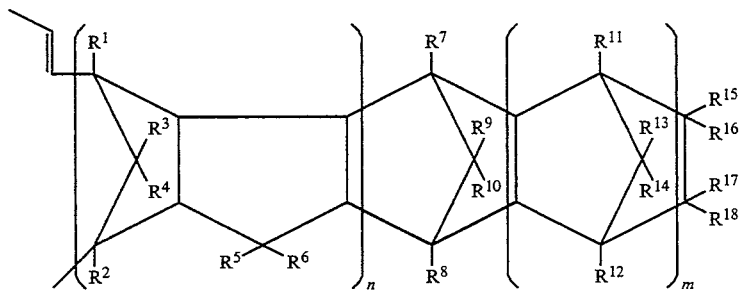

Hydrogenation

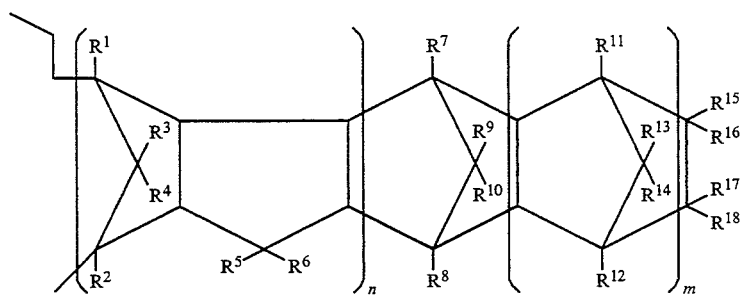

Hydrogenation

The cycloolefin represented by the formulas [I], [II] or [II-a] can be easily prepared by condensation of a cyclopentadiene with an appropriate olefin or cycloolefin by Diels-Alder reaction.

Examples of the cycloolefins represented by the formula [I], preferably represented by the formula [II] or [II-a], and used in the invention include:

bicyclo [2,2,1]hept-2-ene derivatives,
tetracyclo[4,4,0,1$^{2.5}$,1$^{7.10}$]3-dodecene derivatives;
hexacyclo,6,61,1$^{3.6}$,1$^{10.13}$,0$^{2.7}$,0$^{9.14}$]-4-heptadecene derivatives;
octacyclo[8,8,0,1$^{2.9}$1$^{4.7}$,1$^{11.18}$, 1$^{13.16}$, 0$^{3.8}$,0$^{12.17}$]-5-docosene derivatives;
pentacyclo[6,6,1,1$^{3.6}$,0$^{2.7}$,0$^{9.14}$]-4-hexadecene derivatives;
heptacyclo-5-icosene derivatives;
heptacyclo-5-heneicosene derivatives;
tricyclo[4,3,0,1$^{2.5}$]-3-decene derivatives;
tricyclo[4,3,0,1$^{2.5}$]-3-undecene derivatives;
pentacyclo[6,5,1,1$^{3.6}$,0$^{2.7}$,0$^{9.13}$]-4-pentadecene derivatives;
pentacyclopentadecadiene derivatives;
pentacylo[4,7,0,1$^{2.5}$,0$^{8.13}$,1$^{9.12}$]-3-pentadecene derivatives;
pentacyclo[7,8,0,1$^{3.6}$,0$^{2.7}$,1$^{10.17}$,0$^{11.16}$, 1$^{12.15}$]-4-eicosene derivatives; and
nonacyclo[9,10,1,1,4,7,0$^{3.8}$,0$^{2.10}$,0$^{12.21}$,1$^{13.20}$,0$^{14.19}$,1$^{15.18}$]-5-pentacosene derivatives.

Examples of the above-mentioned compounds are described below.

Bicyclo[2,2,1]hept-2-ene derivatives such as

bicyclo[2,2,1]hept-2-ene,

6-methylbicyclo[2,2,1]hept-2-ene,

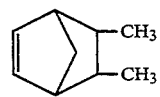

5,6-dimethylbicyclo[2,2,1]hept-2-ene,

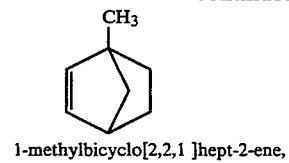
1-methylbicyclo[2,2,1]hept-2-ene,

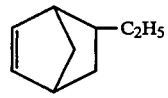
5-ethylbicyclo[2,2,1]hept-3-ene,

6-n-butylbicyclo[2,2,1]hept-2-ene,

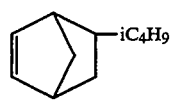
6-isobutylbicyclo[2,2,1]hept-2-ene, and

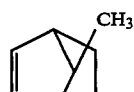
7-methylbicyclo[2,2,1]hept-2-ene;

Tetracyclo[4,4,0,1$^{2.5}$,1$^{7.10}$]-3-dodecene derivatives such as

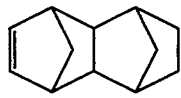
tetracyclo[4,4,0,1$^{2.5}$,1$^{7.10}$]-3-dodecene,

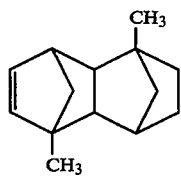
5,10-dimethyltetracyclo-[4,4,0,1$^{2.5}$, 1$^{7.10}$]-3-dodecene,

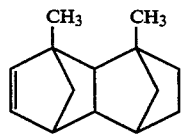
2,10-dimethyltetracyclo-[4,4,0,1$^{2.5}$,1$^{7.10}$]-3-dodecene,

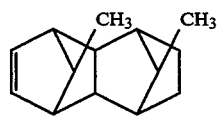
11,12-dimethyltetracyclo-[4,4,0,1$^{2.5}$,1$^{7.10}$]-3-dodecene,

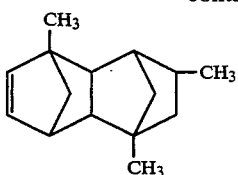
2,7,9-trimethyltetracyclo-[4,4,0,1$^{2.5}$,1$^{7.10}$]-3-dodecene,

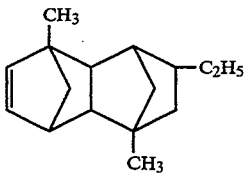
9-ethyl-2,7-dimethyltetracyclo-[4,4,0,1$^{2.5}$,1$^{7.10}$]-3-dodecene,

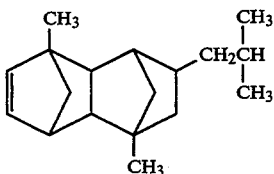
9-isobutyl-2,7-dimethyltetracyclo-[4,4,0,1$^{2.5}$,1$^{7.10}$]-3-dodecene,

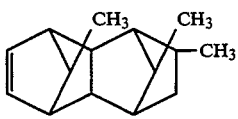
9,11,12-trimethyltetracyclo-[4,4,0,1$^{2.5}$,1$^{7.10}$]-3-dodecene,

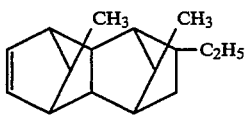
9-ethyl-11,12-dimethyltetracyclo-[4,4,0,1$^{2.5}$, 1$^{7.10}$]-3-dodecene,

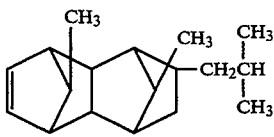
9-isobutyl-11,12-dimethyltetracyclo-[4,4,0,1$^{2.5}$,1$^{7.10}$]-3-dodecene,

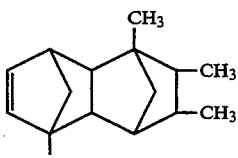
5,8,9,10-tetramethyltetracyclo-[4,4,0,1$^{2.5}$,1$^{7.10}$]-3-dodecene,

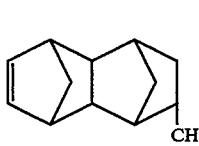
8-methyltetracyclo[4,4,0,1$^{2.5}$,1$^{7.10}$]-3-dodecene,

-continued

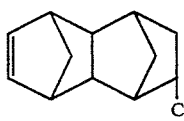
8-ethyltetracyclo[4,4,0,1$^{2.5}$,1$^{7.10}$]-3-dodecene,

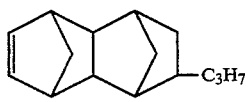
8-propyltetracyclo[4,4,0,1$^{2.5}$,1$^{7.10}$]-3-dodecene,

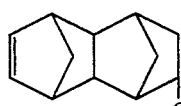
8-hexyltetracyclo[4,4,0,1$^{2.5}$,1$^{7.10}$]-3-dodecene,

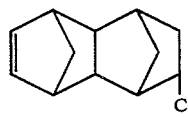
8-stearyltetracyclo[4,4,0,1$^{2.5}$,1$^{7.10}$]-3-dodecene,

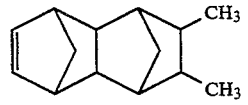
8,9-dimethyltetracyclo-[4,4,0,1$^{2.5}$,1$^{7.10}$]-3-dodocene,

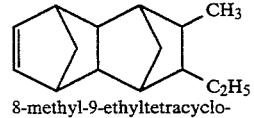
8-methyl-9-ethyltetracyclo-[4,4,0,1$^{2.5}$,1$^{7.10}$]-3-dodecene,

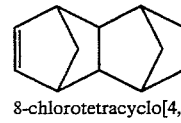
8-chlorotetracyclo[4,4,0,1$^{2.5}$,1$^{7.10}$]-3-dodecene,

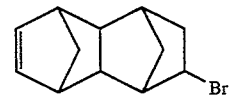
8-bromotetracyclo[4,4,0,1$^{2.5}$,1$^{7.10}$]-3-dodecene

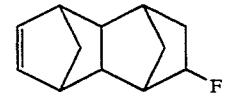
8-fluorotetracyclo[4,4,0,1$^{2.5}$,1$^{7.10}$]-3-dodecene,

-continued

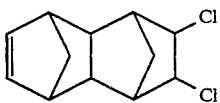
8,9-dichlorotetracyclo-[4,4,0,1$^{2.5}$,1$^{7.10}$]-3-dodecene,

8-cyclohexyltetracyclo-[4,4,0,1$^{2.5}$,1$^{7.10}$]-3-dodecene,

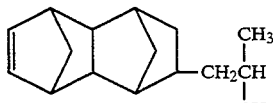
8-isobutyltetracyclo[4,4,0,1$^{2.5}$,1$^{7.10}$]-3-dodecene,

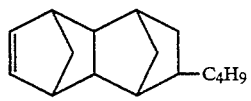
8-butyltetracyclo[4,4,0,1$^{2.5}$,1$^{7.10}$]-3-dodecene,

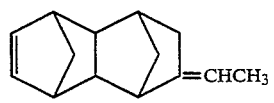
8-ethylidenetetracyclo-[4,4,0,1$^{2.5}$,1$^{7.10}$]-3-dodecene,

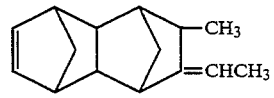
8-ethylidene-9-methyltetracyclo-[4,4,0,1$^{2.5}$,1$^{7.10}$]-3-dodecne,

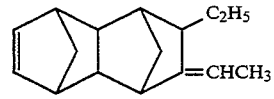
8-ethylidene-9-ethyltetracyclo-[4,4,0,1$^{2.5}$,1$^{7.10}$[-3-dodecene,

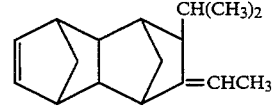
8-ethylidene-9-isopropyltetracyclo-[4,4,0,1$^{2.5}$,1$^{7.10}$]-3-dodecene,

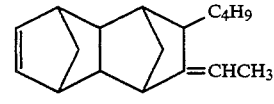
8-ethylidene-9-butyltetracyclo-[4,4,0,1$^{2.5}$,1$^{7.10}$]-3-dodecene,

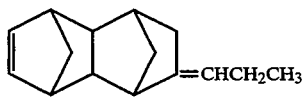

8-n-propylidenetetracyclo-[4,4,0,1$^{2.5}$,1$^{7.10}$]-3-dodecene,

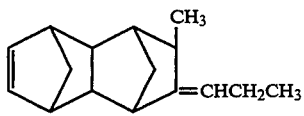

8-n-propylidene-9-methyltetracyclo-[4,4,0,1$^{2.5}$,1$^{7.10}$]-3-dodecene,

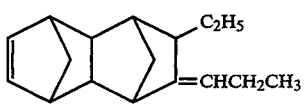

8-n-propylidene-9-ethyltetracyclo-[4,40,1$^{2.5}$,1$^{7.10}$]-3-dodecene,

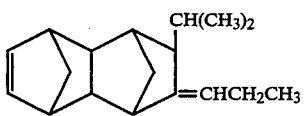

8-n-propylidene-9-isopropyltetracyclo[4,4,0,1$^{2.5}$,1$^{7.10}$]-3-dodecene,

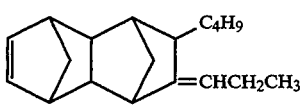

8-n-propylidene-9-butyltetracyclo[4,4,0,1$^{2.5}$,1$^{7.10}$]-3-dodecene,

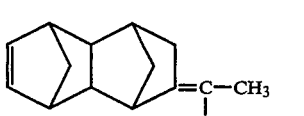

8-isoprpylidenetetracyclo-[4,4,0,1$^{2.5}$,1$^{7.10}$]-3-dodecene,

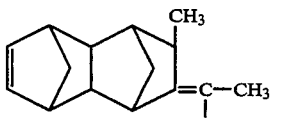

8-isopropylidene-9-methyltetracyclo-[4,4,0,1$^{2.5}$,1$^{7.10}$]-3-dodecene,

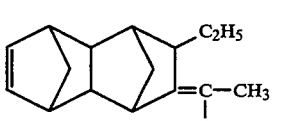

8-isopropylidene-9-ethyltetracyclo-[4,4,0,1$^{2.5}$,1$^{7.10}$]-3-dodecene,

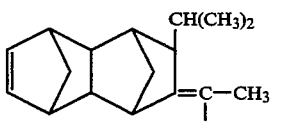

8-isopropylidene-9-isoprpyltetracyclo-[4,4,0,1$^{2.5}$,1$^{7.10}$]-3-dodecene, and

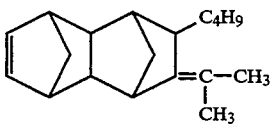

8-isopropylidene-9-butyltetracyclo-[4,4,0,1$^{2.5}$,1$^{7.10}$]-3-dodecene.

Hexacyclo[6,6,1,1$^{3.6}$,1$^{10.13}$,0$^{2.7}$,0$^{9.14}$]-4-heptadecene derivatives such as

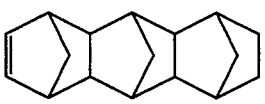

hexacyclo[6,6,1,1$^{3.6}$,1$^{10.13}$,0$^{2.7}$,0$^{9.14}$]-4-heptadecene,

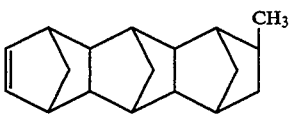

12-methylhexacyclo[6,6,1,1$^{3.6}$,1$^{10.13}$,0$^{2.7}$,0$^{9.14}$]-4-*heptadecene*,

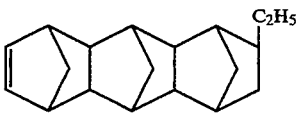

12-ethylhexacyclo[6,6,1,1$^{3.6}$,1$^{10.13}$,0$^{2.7}$,0$^{9.14}$]-4-heptadecene,

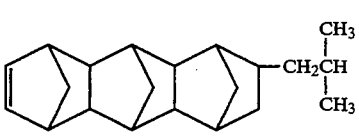

12-isobutylhexacyclo[6,6,1,1$^{3.6}$,1$^{10.13}$,0$^{2.7}$,0$^{9.14}$]-4-heptadecene, and

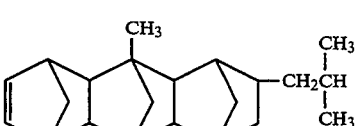

1,6,10-trimethyl-12-isobutylhexacyclo-[6,6,1,1$^{3.6}$,1$^{10.13}$,0$^{2.7}$,0$^{9.14}$]-4-heptadecene;

Octacyclo[8,8,0,1$^{2.9}$,1$^{4.7}$,1$^{11.18}$,1$^{13.16}$, 0$^{3.8}$,0$^{12.17}$[-5-docosene derivatives such as

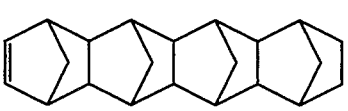

octacyclo[8,8,0,1$^{2.9}$,1$^{4.7}$,1$^{11.18}$,1$^{13.16}$, 0$^{3.8}$,0$^{12.17}$]-5-docosene,

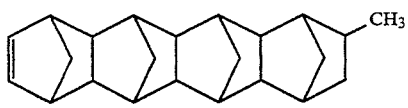

15-methyloctacyclo[8,8,0,1$^{2.9}$,1$^{4.7}$,
1$^{11.18}$,1$^{13.16}$,0$^{3.8}$,0$^{12.17}$]-5-docosene, and

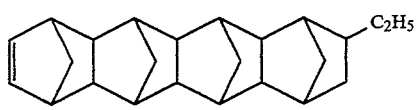

15-ethyloctacyclo[8,8,0,1$^{2.9}$,1$^{4.7}$,
1$^{11.18}$,1$^{13.16}$,0$^{3.8}$,0$^{12.17}$]-5-docosene pentacyclo[6,6,1,1$^{3.6}$,0$^{2.7}$,0$^{9.14}$]-4-hexadecene derivatives such as

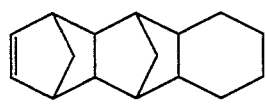

pentacyclo[6,6,1,1$^{3.6}$,0$^{2.7}$,0$^{9.14}$]-4-hexadecene,

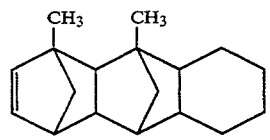

1,3-dimethylpentacyclo-
[6,6,1,1$^{3.6}$,0$^{2.7}$,0$^{9.14}$]-4-hexadecene,

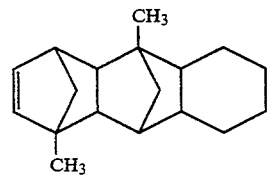

1,6-dimethylpentacyclo-
[6,6,1,1$^{3.6}$,0$^{2.7}$,0$^{9.14}$]-4-hexadecene, and

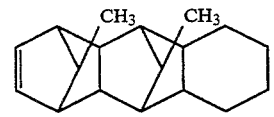

15,16-dimethylpentacyclo-
[6,6,1,1$^{3.6}$,0$^{2.7}$,0$^{9.14}$]-4-hexadecene;

Heptacyclo-5-icosene derivatives or heptacyclo-5-heneicosene derivatives such as

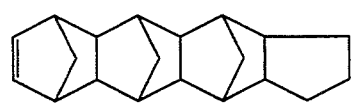

heptacyclo[8,7,0,1$^{2.9}$,1$^{4.7}$,1$^{11.17}$,
0$^{3.8}$,0$^{12.16}$]-5-icosene, and

heptacyclo[8,7,0,1$^{2.9}$,1$^{4.7}$,1$^{11.18}$,
0$^{3.8}$,0$^{12.17}$]-5-heneicosene;

Tricyclo[4,3,0,1$^{2.5}$]-3-decene derivatives such as

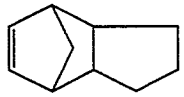

tricyclo[4,3,0,1$^{2.5}$]-3-decene,

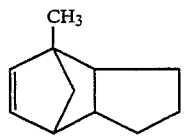

2-methyltricyclo[4,3,0,1$^{2.5}$]-3-decene, and

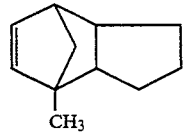

5-methyl-tricyclo[4,3,0,1$^{2.5}$]-3-decene;

Tricyclo[4,4,0,1$^{2.5}$]-3-undecene derivatives such as

tricyclo[4,4,0,1$^{2.5}$]-3-undecene, and

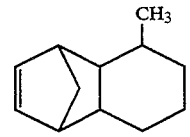

10-methyltricyclo[4,4,0,1$^{2.5}$]-3-undecene;

pentacyclo[6,5,1,1$^{3.6}$,0$^{2.7}$,0$^{9.13}$]-4-pentadecene derivatives such as

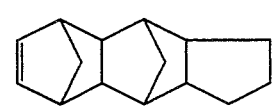

pentacyclo[6,5,1,1$^{3.6}$,0$^{2.7}$,0$^{9.13}$]-4-pentadecene,

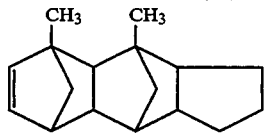

1,3-dimethylpentacyclo[6,5,1,
$1^{3.6},0^{2.7},0^{9.13}$]-4-pentadecene,

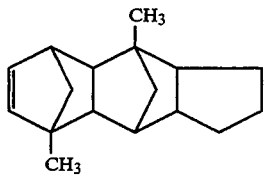

1,6-dimethylpentacyclo[6,5,1,
$1^{3.6},0^{2.7},0^{9.13}$]-4-pentadecene, and

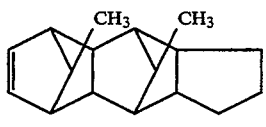

14,15-dimethylpentacyclo[6,5,1,
$1^{3.6},0^{2.7}0^{9.13}$]-4-pentadecene;

Diene compounds such as

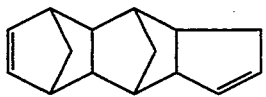

pentacyclo[6,5,1,$1^{3.6},0^{2.7},0^{9.13}$]-
4,10-pentadecadiene;

Pentacyclo[4,7,0,$1^{2.5},0^{8.13},1^{9.12}$]-3-pentadecene derivatives, such as

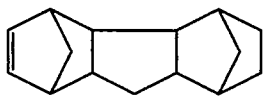

pentacyclo[4,7,0,$1^{2.5},0^{8.13},1^{9.12}$]-3-
pentadecene, and

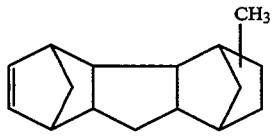

methyl-substituted pentacyclo-
[4,7,0,$1^{2.5},0^{8.13},1^{9.12}$]-3-pentadecene;

Heptacyclo[7,8,0,$1^{3.6},0^{2.7},1^{10.17},0^{11.16},1^{12.15}$]-4-eicosene derivatives such as

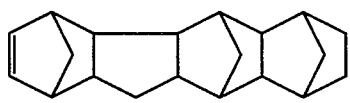

heptacyclo[7,8,0,$1^{3.6},0^{2.7},1^{10.17},$
$0^{11.16},1^{12.15}$]-4-eicosene, and

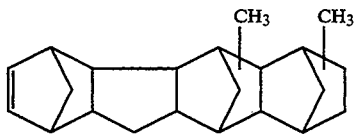

dimethyl-substituted heptacyclo-
[7,8,0,$1^{3.6},0^{2.7},1^{10.17},0^{11.16},1^{12.15}$]-4-
eicosene;

Nonacyclo[9,10,1,$1^{4.7},0^{3.8},0^{2.10},0^{12.21},1^{13.20}0^{14.19},1^{15.18}$-5-pentacosene derivatives such as

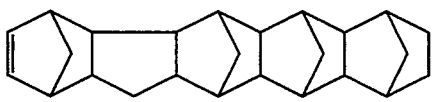

nonacyclo[9,10,1,$1^{4.7},0^{3.8},0^{2.10},0^{12.21},$
$1^{13.20},0^{14.19},1^{15.18}$]-5-pentacosene, and

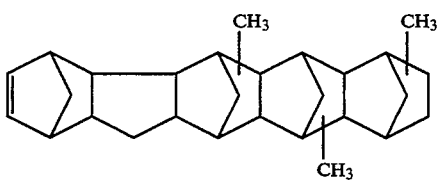

trimethyl-substituted nonacyclo-
[9,10,1,$1^{4.7},0^{3.8},0^{2.10},0^{12.21},1^{13.20},$
$0^{14.19},1^{15.18}$]-5-pentacosene;

Furthermore, such compounds as

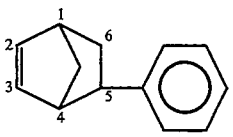

5-phenylbicyclo[2.2.1]hept-2-ene;

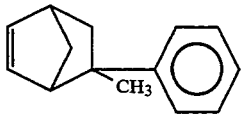

5-methyl-5-phenylbicyclo[2.2.1]hept-
2-ene;

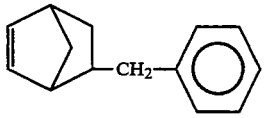

5-benzylbicyclo[2.2.1]hept-2-ene;

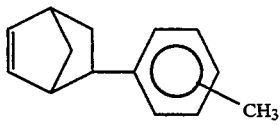

5-tolyl-bicyclo[2.2.1]hept-2-ene;

-continued

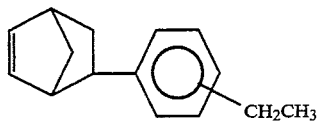

5-(ethylphenyl)-bicyclo[2.2.1]hept-2-ene;

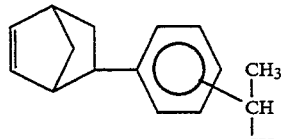

5-(isopropylphenyl)-bicyclo[2.2.1]hept-2-ene;

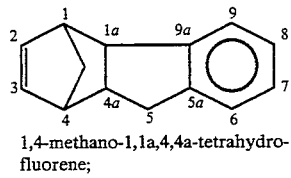

1,4-methano-1,1a,4,4a-tetrahydrofluorene;

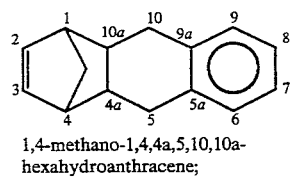

1,4-methano-1,4,4a,5,10,10a-hexahydroanthracene;

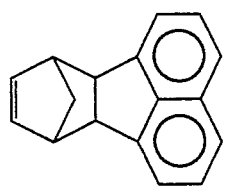

cyclopentadiene-acenaphthylene addition products,

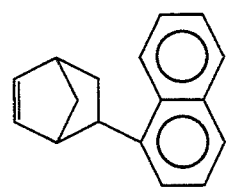

5-(α-naphthyl)-bicyclo[2.2.1]hept-2-ene, and

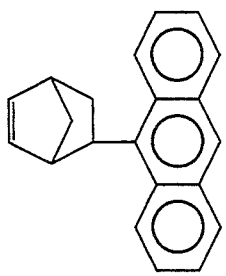

5-(anthracenyl)-bicyclo[2.2.1]hept-2-ene.

In the invention, monomers which are copolymerized with the cycloolefin having the formula [I], [II] or [II-a] to form a copolymer having an alicyclic structure are olefin compounds. Ethylene is usually used as the olefin compound in the present invention. Olefin compounds other than ethylene may also be copolymerized with the cycloolefin and ethylene to form copolymers having an alicyclic structure. Examples of other olefin compounds copolymerizable with ethylene and the cycloolefin compound having the formula [I], [II] or [II-a] in the invention include α-olefins having from 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicosene;

cycloolefins such as cyclopentene, cyclohexene, 3-methylcyclohexene, cyclooctene and 3a, 5, 6, 7a-tetrahydro-4, 7-methano-1H-indene;

non-conjugated dienes such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene; and norbornene compounds such as norbornene-2, 5-methylnorbornene-2, 5-ethylnorbornene-2, 5-isopropylnorbornene-2, 5-n-butylnorbornene-2, 5-isobutylnorbornene-2, 5,6-dimethylnorbornene-2, 5-chloronorbornene-2, 2-fluoronorbornene-2 and 5,6-dichloronorbornene-2.

The above-mentioned other olefins can be employed singly or in combination.

The reaction of the above-mentioned olefins such as ethylene with the cycloolefin having the formula [I], preferably the formula [II] or [II-a], is usually carried out in a hydrocarbon solvent.

Examples of the hydrocarbon solvents employed in the invention include aliphatic hydrocarbons such as hexane, heptane, octane and kerosene; alicyclic hydrocarbons such as cyclohexane and methylcyclohexane; and aromatic hydrocarbons such as benzene, toluene and xylene. Moreover, among the polymerizable unsaturated monomers used in the preparation of the olefin polymer having an alicyclic structure, there may also be used, as a reaction solvent, those monomers which are liquid at a reaction temperature.

The above-mentioned solvents can be employed singly or in combination.

As catalysts used in the copolymerization reaction of the olefins with the cycloolefins having the formula [I], preferably the formula [II] or [II-a], there can be employed a catalyst comprising a vanadium compound and an organoaluminum compound which are both soluble in the above-described hydrocarbon solvent used as a reaction medium.

As the vanadium compounds which can be used as a catalyst in the invention, there can be mentioned compounds having the formula $VO(OR)_aX_b$ or $V(OR)_cX_d$ wherein R is a hydrocarbon group, X is halogen, and a, b, c and d are numbers satisfying $0<a<3$, $0<b<3$, $2<a+b<3$, $0<c<4$, $0<d<4$, and $3<c+d<4$.

Moreover, the vanadium compounds represented by the above formulas may also be adducts of an electron donor. Concrete examples of the vanadium compounds include $VO(Cl_3)$,
$VO(OC_2H_5)Cl_2$,
$VO(OC_2H_5)_2Cl$,
$VO(O\text{-iso-}C_3H_7)Cl_2$,
$VO(O\text{-n-}C_4H_9)Cl_2$,
$VO(OC_2H_5)_3$,
$VCl_4$,
$VOCl_2$,
$VOBr_2$,
$VO(O\text{-n-}C_4H_9)_3Cl$, and
$VCl_3 \cdot 2O(C_8H_{17})OH$.

The above-described vanadium compounds can be employed alone or in combination.

The electron donors forming the adducts together with the vanadium compounds are, for example, oxygen-containing electron donors such as alcohols, phenols, ketones, aldehydes, carboxylic acids, esters of organic and inorganic acids, ethers, acid amides, acid anhydrides and alkoxysilanes; and nitrogen-containing electron donors such as ammonia, amines, nitriles and isocyanates.

Concrete examples of suitable electron donors include alcohols having from 1 to 18 carbon atoms, such as methanol, ethanol, propanol, pentanol, hexanol, octanol, dodecanol, octadecyl alcohol, oleyl alcohol, benzyl alcohol, phenylethyl alcohol, isopropyl alcohol, cumyl alcohol and isopropylbenzyl alcohol;

phenolic compounds having from 6 to 20 carbon atoms, which may have a lower alkyl group, such as phenol, cresol, xylenol, ethylphenol, propylphenol, nonylphenol, cumylphenol and naphthol;

ketones having from 3 to 15 carbon atoms, such as acetone, methyl ethyl ketone, methyl isobutyl ketone, acetophenone, benzophenone and benzoquinone;

aldehydes having from 2 to 15 carbon atoms, such as acetaldehyde, propionaldehyde, octylaldehyde, benzaldehyde, tolualdehyde and naphthoaldehyde;

organic acid esters having from 2 to 30 carbon atoms, such as methyl formate, methyl acetate, ethyl acetate, vinyl acetate, propyl acetate, octal acetate, cyclohexyl acetate, ethyl propionate, methyl butyrate, ethyl valerate, methyl chloroacetate, ethyl dichloroacetate, methyl (meth)acrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenecarboxylate, diethyl nadate, diisopropyl tetrahydrophthalate, diethyl phthalate, diisobutyl phthalate, di-n-butyl phthalate, di-2-ethylhexyl phthalate, $\gamma$-butyrolactone, $\delta$-valerolactone, coumarin, phthalide and ethylene carbonate;

acid halides having from 2 to 15 carbon atoms, such as acetyl chloride, benzoyl chloride, toluyl chloride and anisic acid chloride;

ethers having from 2 to 20 carbon atoms, such as methyl ether, ethyl ether, isopropyl ether, butyl ether, amyl ether, tetrahydrofuran, anisole and diphenyl ether;

acid amides such as acetamide, benzamide and toluamide;

amines such as methylamine, ethylamine, diethylamine, tributylamine, piperidine, tribenzylamine, aniline, pyridine, picoline and tetramethylenediamine;

nitriles such as acetonitrile, benzonitrile and tolunitrile; and alkoxysilanes such as ethyl silicate and diphenyldimethoxysilane. The illustrated electron donors may be used alone or in combination.

The organoaluminum compounds used as the catalyst in the invention are compounds having at least one Al-C bond in the molecule.

One example of such organoaluminum compounds is represented by the formula (i):

$$R^1{}_mAl(OR^2)_nH_pX_q \qquad (i)$$

wherein $R^1$ and $R^2$ each independently represent a hydrocarbon group having normally from 1 to 15, preferably from 1 to 4 carbon atoms; X is halogen; and m, n, p and q are numbers satisfying $0<m<3$, $0<n<3$, $0<p<3$, $0<q<3$, and $m+n+p+q=3$.

Another example of such compounds is a complex alkyl compound of aluminum and a metal of Group I, represented by the formula (ii):

$$M^1AlR^1{}_4 \qquad (II)$$

wherein $M^1$ is Li, Na or K; and $R^1$ is as defined above.

Examples of the organoaluminum compounds having the formula (i) include:

compounds having the formula of $R^1{}_mAl(OR^2)_{3-m}$ wherein $R^1$ and $R^2$ are as defined above, and m is a number preferably satisfying $1.5<m\ 21\ 3$;

compounds having the formula of $R^1{}_mAlX_{3-m}$ wherein $R^1$ and X are as defined above, and m is a number preferably satisfying $0<m<3$;

compounds having the formula of $R^1{}_mAlH_{3-m}$ wherein $R^1$ is as defined above, and m is a number preferably satisfying $2<m<3$; and compounds having the formula of $R^1{}_mAl(OR^2)_n X_q$ wherein $R^1$, $R^2$ and X are as defined above, and m, n and q are numbers satisfying $0<m<3$, $0<n<3$, $0<q<3$ and $m+n+q=3$.

Concrete examples of the organoaluminum compounds having the formula (i) include trialkylaluminum compounds such as triethylaluminum, tributylaluminum and triisopropylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds such as those having an average composition represented by, for example, the formula of R$^1$$_{2.5}$Al-(OR$^2$)$_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as ethylaluminum dichloride, propylaluminum dichloride and butylaluminum dibromide;

dialkylaluminum hydrides such as diethylaluminum hydride and dibutylaluminum hydride;

partially hydrogenated alkylaluminum compounds such as ethylaluminum dihydride and propylaluminum dihydride (alkylaluminum dihydride); and partially alkoxylated and halogenated alkylaluminum compounds such as ethylaluminum ethoxychloride, butylaluminum butoxychloride and ethylaluminum ethoxybromide.

Furthermore, the organoaluminum compounds may be such compounds being similar to those having the above-mentioned formula (i) as organoaluminum compounds in which two aluminum atoms are bonded together via, for example, an oxygen atom or a nitrogen atom. Concrete examples of such compounds are as follows:

(C$_2$H$_5$)$_2$AlOAl(C$_2$H$_5$)$_2$,
(C$_4$H$_9$)$_2$AlOAl(C$_4$H$_9$)$_2$, and
(C$_2$H$_5$)$_2$AlNAl(C$_2$H$_5$)$_2$.
C$_6$H$_5$ Examples of the organoaluminum compounds having the formula (ii) include LiAl(C$_2$H$_5$)$_4$, and
LiAl(C$_7$H$_{15}$)$_4$.

Among the above-exemplified compounds, particularly preferred are dialkylaluminum halides, alkylaluminum dihalides and mixtures thereof.

The above-described vanadium compounds and organoaluminum compounds are used in the reaction system in the following amounts. The vanadium compounds are used in such a manner that the concentration of the vanadium compounds in the reaction system is normally 0.01-5 gram atom/liter, preferably 0.05-3 gram atom/liter in terms of vanadium atoms. The organoaluminum compounds are used in such a manner that the ratio of aluminum atoms to vanadium atoms (Al/V) in the polymerization system is normally at least 2, preferably 2-50, particularly preferably 3-20.

The olefin polymer having an alicyclic structure obtained by using the above-mentioned catalysts generally contains repeating units derived from ethylene in an amount of 99 to 1 mol %, preferably 98 to 2 mol % and repeating units derived from a cycloolefin in an amount of 1-99 mol %, preferably 2 to 98 mol %. In the olefin polymer, the repeating units derived from an olefin such as ethylene and the repeating units derived from a cycloolefin are substantially linearly arranged in the molecule.

In other words, the olefin polymer obtained as described above and having an alicyclic structure contains repeating units which form the alicyclic structure and which are represented by the following formula [III] or [IV]:

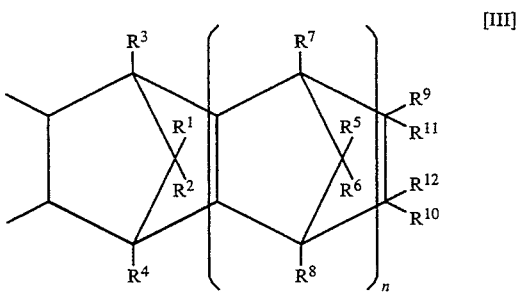

wherein R$^1$ to R$^{12}$ are as defined in the formula [I];

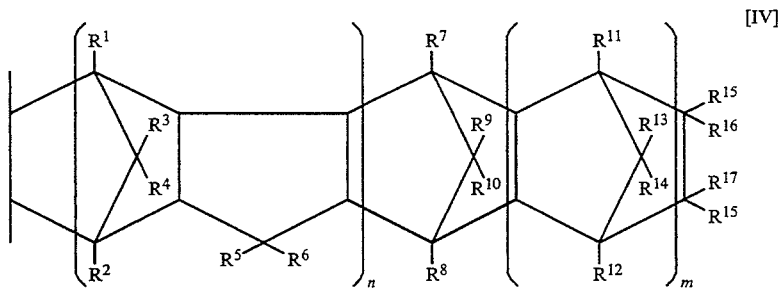

wherein R$^1$ to R$^{18}$ are as defined in the formula [I].

The thus obtained olefin polymers having an alicyclic structure usually have an intrinsic viscosity [η] from 0.005 to 20 dl/g as measured at 135° C. in decalin, a softening temperature (TMA) of from 20° to 220° C. as measured by a thermal mechanical analyzer, a glass transition temperature (Tg) of from 10° to 210° C. and a crystallinity index of not more than 5% as measured by X-ray diffractiometry, In the invention, such molded products having especially excellent transparency as optical instrument parts can be manufactured by using an olefin polymer having an intrinsic viscosity [η] as described above of from 0.3 to 20 dl/g, a softening temperature (TMA) of from 30° to 210° C., a glass transition temperature (Tg) of from 20° to 200° C. and a crystallinity index of almost 0%.

The above-described intrinsic viscosity, softening temperature (TMA), glass transition temperature (Tg) and crystallinity index can be easily controlled by varying, for example, polymerization conditions.

The above-described olefin polymer having an alicyclic structure of the present invention is contained in the thermoplastic resin forming the resin composition of the present invention in an amount of at least 50% by weight, preferably at least 60% by weight, particularly preferably at least 70% by weight.

In the resin compositions of the present invention, it is preferable that the olefin polymer having the above-described alicyclic structure is singly used as a resin forming the thermoplastic resin in the case where an especially high degree of transparency is required for the products thereof. In the case where mechanical strength is required for the products, a flexible polymer may be incorporated into the above-described cycloolefin polymer.

There may be mentioned the following polymers or copolymers as the flexible polymers of the invention:

(i) a flexible polymer having repeating units derived from a cycloolefin;
(ii) an α-olefin copolymer;
(iii) an α-olefin/diene copolymer;
(iv) an aromatic vinyl hydrocarbon/conjugated diene flexible copolymer; and
(v) a flexible polymer or copolymer prepared from isobutylene, or isobutylene and conjugated diene.

These flexible polymers will be described hereinafter.

Flexible polymer (i) containing repeating units derived from a cycloolefin

The flexible polymer containing repeating units derived from a cycloolefin is a copolymer of ethylene with the above-mentioned cycloolefin and α-olefin. The α-olefin includes α-olefins having 3–20 carbon atoms, such as propylene, 1-butene, 4-methyl-1-pentene, 1-hexene, 1-octene, 1-decene, 1-dodecene, 1-tetradecene, 1-hexadecene, 1-octadecene and 1-eicosene. Of these compounds, α-olefins having 3–20 carbon atoms are preferable. Further, there may be used a cycloolefin and a cyclodiene such as norbornene, ethylydenenorbornene and dicyclopentadiene.

The flexible polymer (i) containing repeating units derived from a cycloolefin contains repeating units derived from ethylene in an amount of usually 40–99 mol %, preferably 50–90 mol %, particularly preferably 75–90 mol %. It also contains repeating units derived from α-olefin in an amount of usually 1–45, preferably 1–35 mol %. It further contains repeating units derived from a cycloolefin in an amount of usually 1–40 tool%, preferably 1–20 tool%, particularly preferably 2–15 tool%.

In the flexible polymer (i), the above-mentioned three types of repeating units are randomly arranged, and they are also substantially linearly arranged. The fact that the flexible polymer has a substantially linear structure and no crosslinking structure can be confirmed by observing complete dissolution of the copolymer in decalin at 130° C.

The flexible polymer (i) containing repeating units derived from a cycloolefin, differing from the above-described cycloolefin polymer, has a glass transition temperature (Tg) of usually up to 0° C., preferably up to −10° C., and an intrinsic viscosity [η] of usually 0.01–10 dl/g, preferably 0.08–7 dl/g as measured in decalin at 135° C. The flexible polymer (i) has crystallinity of usually 0–10%, preferably 0–7%, particularly preferably 0–5% as measured by X-ray diffraction.

The flexible polymer (i) can be prepared by the methods proposed by the applicants of the invention in Japanese Patent L-O-P Nos. 168708/1985, 20816/1986, 115912/1986, 115916/1986, 271308/1986, 272216/1986 and 252406/1987, and by selecting suitable conditions.

α-Olefin copolymer (ii)

The α-olefin copolymer (ii) used as a flexible polymer in the present invention comprises at least two kinds of α-olefins, and is an amorphous or low crystallinity copolymer. There can be mentioned an ethylene/α-olefin copolymer and a propylene/α-olefin copolymer as concrete examples of the copolymer.

An α-olefin having 3 to 20 carbon atoms is usually used as the α-olefin forming the ethylene/α-olefin copolymer. There may be mentioned propylene, 1-butene, 4-methyl-1-pentene, 1-hexene, 1-octene, 1-decene and a mixture of these compounds as concrete examples of the α-olefin. Of these, an α-olefin having 3 to 10 carbon atoms is preferable, and propylene or 1-butene is particularly preferable.

Though the molecular ratio of repeating units derived from ethylene to those derived from an α-olefin (ethylene/α-olefin) in the ethylene/α-olefin copolymer depends on the type of α-olefin, the ratio is usually 40/60–95/5. In the case where propylene is used as an α-olefin, the above-mentioned molecular ratio is usually 30/70, preferably 40/60–95/5, particularly preferably 50/50–90/10, and in the case where an α-olefin having at least 4 carbon atoms is used, the ratio is usually 50/50–95/5, preferably 80/20–95/5.

An α-olefin forming the propylene/α-olefin copolymer is usually one having 4 to 20 carbon atoms. There can be mentioned 1-butene, 4-methyl-1-pentene, 1-hexene, 1-octene, 1-decene and a mixture of these compounds as concrete examples of the α-olefin. Of these compounds, an α-olefin having 4 to 10 carbon atoms is especially preferable.

In the above-described propylene/α-olefin copolymer, though the molecular ratio of repeating units derived from propylene to those derived from the α-olefin (propylene/α-olefin) depends on the type of the α-olefin, the ratio is usually 50/50–95/5. In the case where the α-olefin has at least 5 carbon atoms, the ratio is preferably 80/20–95/5.

Further, the α-olefin flexible polymer has an intrinsic viscosity [η] of 0.2–10 dl/g, preferably 1–5 dl/g, and a density of usually 0.82–0.96 g/cm$^3$, preferably 0.84–0.92 g/cm$^3$.

The α-olefin flexible polymer may be graft modified with an unsaturated carboxylic acid or a derivative thereof. The graft modifying ratio is usually 0.01–5% by weight, preferably 0.1–4% by weight. As examples of the unsaturated carboxylic acids or derivatives thereof, there can be mentioned acrylic acid, maleic acid, fumaric acid, tetrahydrophthalic acid, itaconic acid, citraconic acid, crotonic acid, isocrotonic acid and nadic acid (trade name, endo-cis bicyclo[2,2,1]hept-5-ene-2,3-dicarboxylic acid), and halides, amides, imides, anhydrides and esters of these unsaturated carboxylic acids. Concrete examples of the above-described unsaturated carboxylic acid derivatives include maleyl chloride, maleimide, maleic anhydride, citraconic acid anhydride, maleic acid monomethyl ester, maleic acid dimethyl ester and glycidyl maleate.

Of these, particularly preferable are maleic acid, maleic anhydride, nadic acid (trade name) and nadic acid anhydride (trade name). Modifying an α-olefin flexible polymer by using a graft monomer as described above can be practiced by utilizing conventionally known various methods. For example, an α-olefin flexible polymer is modified by melting it and adding graft monomers thereto to conduct graft polymerization, or by dissolving an α-olefin flexible polymer into a solvent and adding graft monomers to the solution to conduct graft polymerization. The above-described grafting is preferably carried out by using a radical initiator, and the radical initiator makes the grafting reaction efficient.

The above-described grafting reaction is usually conducted in the temperature range of 60 to 350° C. and the radical initiator is usually used in an amount of usually 0.001 to 1 part by weight based on 100 parts by weight of the α-olefin flexible polymer.

Furthermore, there is no limitation on the radical initiator used in the reaction, and any compound ordinarily used as an initiator in grafting reactions can be used.

The following radical initiators can be used in the grafting reaction in the present invention:

organic peroxides or organic peresters such as benzoyloxy peroxide, dichlorobenzoyl peroxide, dicumyl peroxide, di-tert-butyl peroxide, 2,5-dimethyl-2,5-di(peroxide benzoate) hexene-3, 1,4-bis(tert-butylperoxyisopropyl)benzene, lauroyl peroxide, tert-butyl peracetate, 2,5-dimethyl-2,5-di(tert-gutylperoxy)hexene-3, 2,5-dimethyl-2,5-di(tert-butylperoxy)haxane, tert-butyl perbenzoate, tert-butyl per-sec-octate, tert-butyl perpivalate, cumyl perpivalate and tert-butyl perdiethylacetate; and azo compounds such as azobisisobutyronitrile and dimethylazoisobutyrate. Of these compounds, there can be preferably used dialkyl peroxides such as dicumyl peroxide, di-tert-butyl peroxide, 2,5-dimethyl-2,5-di(tert-butylperoxy)hexene-3, 2,5-dimethyl-2,5-di(tert-butylperoxy)hexane and 1,4-bis(tert-butylperoxyisopropyl)benzene.

Incorporation of the following α-olefin flexible polymers among the above-described α-olefin flexible polymers into the thermoplastic resin significantly improves impact strength of the molded products: an ethylene/propylene random copolymer containing 35-50 mol % of ethylene repeating units and having crystallinity of up to 5%, or a copolymer obtained by graft modifying an ethylene/α-olefin random copolymer with a graft monomer selected from unsaturated carboxylic acids and derivatives thereof.

α-Olefin/diene Copolymer (iii).

Among the flexible polymers used in the invention, there can be mentioned an ethylene/α-olefin/diene copolymer rubber and a propylene/α-olefin/diene copolymer rubber as examples of the α-olefin/diene copolymer (iii).

An α-olefin having 3 to 20 carbon atoms is usually used for preparing these copolymer rubbers. Examples of the α-olefin include propylene, 1-butene, 1-pentene, 4-methyl-1-pentene, 1-hexene, 1-octene, 1-decene and a mixture of these compounds. Of these compounds, an α-olefin having 3 to 10 carbon atoms is preferable. In the case of employing a propylene/α-olefin/diene copolymer, an α-olefin having 4 to 20 carbon atoms is used.

Examples of a diene component forming these copolymer rubbers are chain nonconjugated dienes such as 1,4-hexadiene, 1,6-octadiene, 2-methyl-1,5-hexadiene, 6-methyl-1,5-heptadiene and 7-methyl-1,6-octadiene, cyclic nonconjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene, 2,3-diisopropylidene-5-norbornene, 2-ethylidene-3-isopropylidene-5-norbornene and 2-propenyl-2,2-norbornadiene.

Though the molecular ratio of repeating units derived from ethylene to repeating units derived from the α-olefin (ethylene/α-olefin) in the above-described ethylene/α-olefin/diene copolymer rubber depends on the kind of the α-olefin, the ratio is usually 50/50-95/5, preferably 50/50-90/10.

Furthermore, the copolymer rubber contains repeating units derived from a diene component in an amount of usually 0.5-10 mol %, preferably 0.5-5 mol %.

Though the molecular ratio of repeating units derived from propylene to repeating units derived from the α-olefin (propylene/α-olefin) in the above-described propylene/α-olefin/diene copolymer rubber depends on the type of the α-olefin, the ratio is usually set in the range of 50/50-95/5. In the case where 1-butene is used as the α-olefin, the molecular ratio of repeating units derived from propylene to repeating units derived from 1-butene is preferably in the range of 50/50-90/10, and in the case where an α-olefin having at least 5 carbon atoms is used, the molecular ratio of repeating units derived from propylene to repeating units derived from the α-olefin is usually set in the range of 80/20-95/5.

An α-olefin/diene flexible polymer as described above has crystallinity of ordinarily 0-10%, preferably 0-5% measured by X-ray diffraction.

Furthermore, the α-olefin/diene flexible polymer has an intrinsic viscosity [η] of usually 0.1-10 dl/g, preferably 1-5 dl/g measured in decalin at 135° C., an iodine value of usually 1-30, preferably 5-25, and a density of usually 0.82-1.00 g/cm$^3$, preferably 0.85-0.90 g/cm$^3$.

Aromatic vinyl hydrocarbon/conjugated diene flexible copolymer (iv)

The aromatic vinyl hydrocarbon/conjugated diene flexible copolymer used as a flexible polymer of the invention is a random copolymer or a block copolymer of an aromatic vinyl hydrocarbon with a conjugated diene compound, or a hydrogenated product of the random copolymer or block copolymer. Concrete examples of these compounds include a styrene/butadiene block copolymer rubber, a styrene/butadiene/styrene block copolymer rubber, a styrene/isoprene block copolymer rubber, a styrene/isoprene/styrene block copolymer rubber, a hydrogenated styrene/butadiene/styrene block copolymer rubber, a hydrogenated styrene/isoprene/styrene block copolymer rubber and a styrene/butadiene random copolymer rubber.

In the styrene/butadiene copolymer rubber, the molecular ratio of repeating units derived from styrene to those derived from butadiene is preferably 0/100-60/40.

In the styrene/butadiene/styrene block copolymer rubber, the molecular ratio of repeating units derived from styrene to those derived from butadiene is usually 0/100-60/40, and the polymerization degree of styrene and butadiene are preferably 0-5000 and 10-20000, respectively.

In the styrene/isoprene block copolymer rubber, the molecular ratio of repeating units derived from styrene to those derived from isoprene is usually 0/100-60/40.

In the styrene/isoprene/styrene block copolymer rubber, the molecular ratio of repeating units derived from styrene to those derived from isoprene is usually 0/100, preferably 60/40, and the polymerization degree of styrene and isoprene are about 0-5000 and 10-20000, respectively.

The hydrogenated styrene/butadiene/styrene block copolymer is a copolymer rubber obtained by partially hydrogenating double bonds remaining in the above-described styrene/butadiene/styrene block copolymer rubber, and has a weight ratio of the styrene portion to the rubber portion (styrene/rubber part) in the copolymer is usually 0/100-50/50.

The hydrogenated styrene/isoprene/styrene block copolymer rubber is a copolymer rubber obtained by partially hydrogenating double bonds remaining in the above-described styrene/isoprene/styrene block copolymer rubber, and has a weight ratio of the styrene portion to the rubber portion (styrene/rubber part) of usually 0/100–50/50.

Such an aromatic vinyl hydrocarbon/conjugated diene flexible copolymer as described above has a weight average molecular weight of usually 500–2,000,000, preferably 10,000–1,000,000 measured by GPC (gel permeation chromatography, in o-dichlorobenzene at 140° C.), and a density of usually 0.80–1.10 g/cm$^3$, preferably 0.88–0.96 g/cm$^3$.

Flexible polymer or copolymer (v) composed of isobutylene or isobutylene conjugated diene The isobutylene flexible polymer or copolymer (v) used in the invention includes polyisobutylene rubber, polyisoprene rubber, polybutadiene rubber or isobutylene/isoprene copolymer rubber.

The copolymers (ii)–(v) (flexible polymers) have characteristics similar to those of the cycloolefin flexible polymer (i), and they have an intrinsic viscosity [η] of usually 0.01–10 dl/g, preferably 0.08–7 dl/g measured in decalin at 135° C., a glass transition temperature (Tg) of usually up to 0° C. preferably up to −10° C. particularly preferably up to −20° C. and crystallinity of 0–10%, preferably 0–7%, particularly preferably 0–5% measured by X-ray diffraction.

Such flexible polymers (i)–(v) as illustrated above can be used singly or in combination.

In general, such a flexible polymer is incorporated into the thermoplastic resin containing the olefin polymer (preferably cycloolefin resin) having an alicyclic structure to form fine dispersed particles in the olefin polymer having an alicyclic structure. The resultant mixture is a so-called "polymer alloy". In such a polymer alloy, the olefin polymer having an alicyclic structure often forms a so-called "sea part" and the flexible polymer often forms so-called "island parts". Though the formation of a polymer alloy by using a flexible polymer tends to somewhat lower the transparency of the resin, the mechanical strength thereof is significantly increased. Such a polymer alloy as described above is advantageously used in the case where mechanical strength is required.

The polymer alloy used in the invention has a melt flow index (MFR; ASTM D1238) of preferably 0.1–100.

Furthermore, formation of a crosslinking structure in such a polymer alloy as described above improves the balance of characteristics such as impact strength, rigidity, a thermal deformation temperature and hardness.

The crosslinking structure is formed by the action of an organic peroxide on the thermoplastic resin in which a flexible polymer is dispersed in the olefin polymer having an alicyclic structure.

There can be mentioned the following compounds as the organic peroxides used in the invention:

ketone peroxides such as methyl ethyl ketone peroxide and cyclohexanone peroxide;

peroxy ketals such as 1,1-bis(tert-butylperoxy)cyclohexane and 2,2-bis(tert-butylperoxy) octane;

hydroperoxides such as tert-butyl hydroperoxide, cumene hydroperoxide, 2,5-dimethylhexane-2,5-dihydroxy peroxide and 1,1,3,3-tetramethylbutyl hydroperoxide;

dialkyl peroxides such as di-tert-butyl peroxide, 2,5-dimethyl-2,5-di(tert-butylperoxy) hexane and 2,5-dimethyl-2,5-di(tert-butylperoxy) hexene-3;

diacyl peroxides such as lauroyl peroxide and benzoyl peroxide; and peroxy esters such as tert-butylperoxy acetate, tert-butylperoxy benzoate and 2,5-dimethyl-2,5-di(benzoylperoxy) hexane.

The above-mentioned organic peroxides are used in an amount of usually 0.01–1 part by weight, preferably 0.05–0.5 part by weight based on 100 parts by weight of the total amount of the olefin polymer having an alicyclic structure and the flexible polymer component.

During the treatment of the polymer alloy with the peroxide, the crosslinking reaction may also be carried out by incorporating a compound having at least 2 radically polymerizable functional groups within the molecule. The efficiency of the crosslinking reaction can further be increased by the use of such a compound. Divinylbenzene, vinyl acrylate, vinyl methacrylate, etc. can be mentioned as examples of the compound having at least 2 radically polymerizable functional groups within the molecule. These compounds may be used in an amount of usually up to 1 part by weight, preferably 0.1–0.5 part by weight based on 100 parts by weight of the total amount of the olefin polymer having an alicyclic structure and the flexible polymer.

When the resin compositions of the invention contain the olefin polymer (preferably cycloolefin resin) having an alicyclic structure and such a flexible polymer as described above, the weight ratio of the olefin polymer having an alicyclic structure to the above-described flexible polymer in the thermoplastic resin is preferably in the range of 100:5–100:100, more preferably 100:7–100:80, particularly preferably 100:10–100:70, though the ratio depends on the type of the resin. That is, the cycloolefin resin is imparted with characteristics such as excellent mechanical strength that the flexible polymer inherently has by using the cycloolefin polymer having an alicyclic structure in an amount within the above-described range and larger than that of the flexible polymer while the characteristics of the cycloolefin polymer is maintained.

Other resins may also be incorporated into the resin compositions of the present invention so long as the incorporation does not impair the characteristics of the olefin polymer having an alicyclic structure or polymer alloy.

The following resins may form the thermoplastic resin of the present invention together with the olefin polymer having an alicyclic structure:

a halogen-containing vinyl polymer,
a polymer derived from an unsaturated acid and a derivative thereof,
a polymer formed out of an unsaturated alcohol, and an amine or an acyl derivative thereof,
a polymer derived from an epoxide,
a polyacetal,
a polysulfone,
a urea resin,
a polyamide resin,
a polyester resin,
a formamide resin and
a natural resin.

The thermoplastic resin of the invention may contain the above-mentioned other resin in an amount of usually up to 50% by weight, preferably up to 40% by weight, though the content depends on the type of the other resin used.

The first cycloolefin resin composition according to the invention comprises the above-mentioned thermoplastic resin containing the olefin polymer having an alicyclic structure, a specific amount of a phenolic stabilizer and a specific amount of an organic thioether stabilizer.

In the first resin composition of the invention, incorporation of the phenolic stabilizer improves the heat resistance of the resin composition, and prevents thermal decomposition or thermal deterioration of the resin during molding. Accordingly, in the manufacture of optical instrument parts, there can be effectively prevented formation of voids, silver streaks and flashes as well as coloring of the molded products.

Concrete examples of the phenolic stabilizers which can be contained in the resin composition of the invention are listed below.

2,6-Di-tert-butyl-4-methylphenol,
2,6-Di-tert-butyl-4-ethylphenol,
2,6-Dicyclohexyl-4-methylphenol,
2,6-Diisopropyl-4-ethylphenol,
2,6-Di-tert-amyl-4-methylphenol,
2,6-Di-tert-octyl-4-n-propylphenol,
2,6-Dicyclohexyl-4-n-octylphenol,
2-Isopropyl-4-methyl-6-tert-butylphenol,
2-tert-Butyl-2-ethyl-6-tert-octylphenol,
2-Isobutyl-4-ethyl-6-tert -hexylphenol,
2-Cyclohexyl-4-n-butyl-6-isopropylphenol,
Styrenated mixed cresol,
dl-α-Tocopherol,
tert-Butylhydroquinone,
2,2'-Methylenebis(4-methyl-6-tert-butylphenol),
4,4'-Butylidenebis(3-methyl-6-tert-butylphenol),
4,4'-Thiobis(3-methyl-6-tert-butylphenol),
4,4'-Thiobis(4-methyl-6-tert-butylphenol),
4,4'-Methylenebis(2,6-di-tert-butylphenol),
2,2'-Methylenebis [6-(1-methylcyclohexyl)-p-cresol],
2,2'-Ethylidenebis(4,6-di-tert-butylphenol),
2,2'-Butylidenebis(2-tert-butyl-4-methylphenol),
1,1,3-Tris(2-methyl-4-hydroxy-5-tert-butylphenyl)-butane,
Triethylene glycol bis[3-(3-tert-butyl-5-methyl-4-hydroxyphenyl)propionate],
1,6-Hexanediol bis[3-(3,5-di-tert-butyl-4-hydroxyphenyl)propionate],
2,2'-Thiodiethylenebis[3-(3,5-di-tert-butyl-4-hydroxyphenyl)propionate],
N,N'-Hexamethylenebis(3,5-di-tert-butyl-4-hydroxyhydrocinnamide),
3,5-Di-tert-butyl-4-hydroxybenzyl phosphonate diethyl ester,
1,3,5-Tris(2,6-dimethyl-3-hydroxy-4-tert-butyl-benzyl)-isocyanurate,
1,3,5-Tris[(3,5-di-tert-butyl-4-hydroxyphenyl)propionyloxyethyl]isocyanurate,
Tris(4-tert-butyl-2,6-dimethyl-3-hydroxybenzyl)-isocyanurate,
2,4-Bis(n-octylthio)-6-(4-hydroxy-3,5-di-tert-butylanilino)-1,3,5-triazine,
Tetrakis[methylene 3-(3,5-di-tert-butyl-4-hydroxyphenyl)propionate]methane,
Bis (3,5-di-tert-butyl-4-hydroxybenzylphosphonic acid ethyl ester) calcium,
Bis (3,5-di-tert-butyl-4-hydroxybenzylphosphonic acid ethyl ester) nickel,
Bis[3,3-bis(3-tert-4-hydroxyphenyl)butyric acid]glycol ester,
N,N'-Bis[3-(3,5-di-tert-butyl-4-hydroxyphenyl)propionyl]hydrazine,
2,2'-Oxamidobis[ethyl-3-(3,5-di-tert-butyl-4hydroxyphenyl)propionate ],
Bis[2-tert-butyl-4-methyl-6-(3-tert-butyl-5-methyl-2-hydroxybenzyl)phenyl] terephthalate,
1,3,5-Trimethyl-2,4,6-tris(3,5-di-tert-butyl-4hydroxybenzyl)benzene,
3,9-Bis[1,1-dimethyl-2-{β-(3-tert-butyl-4-hydroxy-5-methylphenyl)propionyloxy}ethyl]-2,4,8,10-tetraoxaspiro[5,5]undecane,
2,2-Bis[4-(2-(3,5-di-tert-butyl-4-hydroxyhydrocinnamoyloxy))ethoxyphenyl]propane, and
Alkyl esters of β-(3,5-di-tert-butyl-4-hydroxyphenyl)-propionic acid.

Preferably employed in the invention are phenolic stabilizers having any of the following formulas in the molecule:

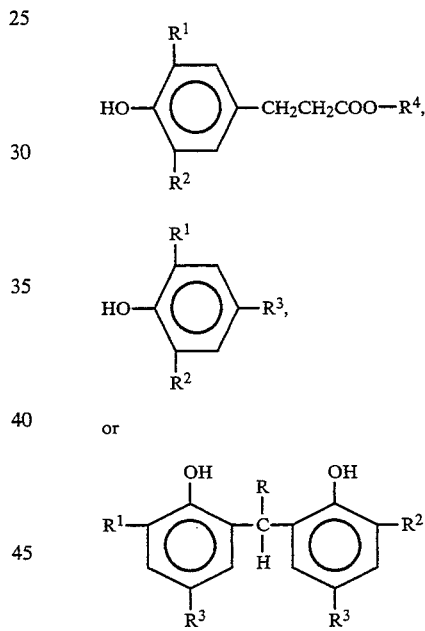

In the above formulas, R represents a hydrogen atom or an alkyl group having 1–6 carbon atoms, each of $R^1$ and $R^2$ independently represents an alkyl group having 1–6 carbon atoms, and $R^3$ represents an alkyl group or an alkoxy group both having 1–6 carbon atoms.

$R^4$ in the above formula represents an alkyl group having 1–22 carbon atoms, or has any of the following structures:

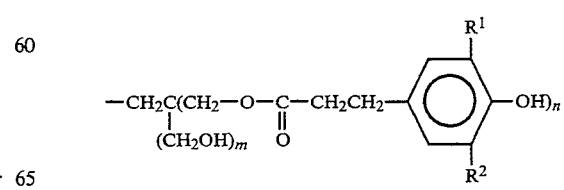

wherein m and n are numbers satisfying the conditions of m+n=3 and n=0, 1, 2 or 3;

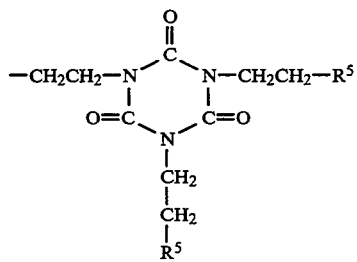

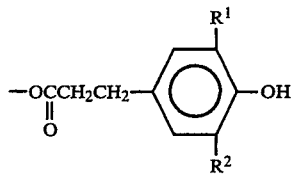

and

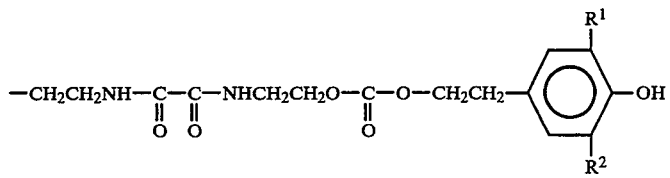

wherein $R^5$ represents

Among the above-described compounds, preferred are 2,6-di-tert-butyl-4-methyl-phenyl, stearyl β-(4-hydroxy-3,5-di-tert-butylphenyl)propionate, 2,2'-ethylidenebis(4,6-di-tert-butylphenol) and tetrakis [methylene-3-(3,5-di-tert-butyl-4-hydroxyphenyl)propionate]methane.

These phenolic stabilizers may be used singly or in combination.

The first resin composition of the present invention contains a phenolic stabilizer as described above in an amount of 0.01 to 5 parts by weight, preferably 0.05 to 3 parts by weight, more preferably 0.1 to 1 part by weight based on 100 parts by weight of the thermoplastic resin containing the olefin polymer having an alicyclic structure. In the case where the resin composition contains less than 0.01 part by weight of the phenolic stabilizer based on 100 parts by weight of the thermoplastic resin containing the olefin polymer having an alicyclic structure, the resin is colored by heating during molding, and therefore the resultant molded products cannot be used for optical products such as optical lenses and optical fibers. Moreover, the molded products have no sufficiently improved thermal deterioration resistance even for use other than optical purposes. In the case where the amount of the phenolic stabilizer exceeds 5 parts by weight, not only the excellent properties of the thermoplastic resin are deteriorated but also light transmittance thereof for optical use is lowered because of the added phenolic stabilizer.

The first resin composition of the invention further contains an organic thioether stabilizer in addition to the above-described phenolic stabilizer.

The organic thioether stabilizer serves to supplement heat resistance during molding of the resin imparted by the above-mentioned phenolic stabilizer.

As the organic thioether stabilizer of the invention, dialkyl thiodipropionates and esters of an alkylthiopropionic acid with a polyol are preferably employed in the invention.

As the dialkyl thiodipropionates of the invention, preferred are those each having alkyl groups each containing 6–20 carbon atoms. As the esters of an alkylthiopropionic acid with a polyol, preferred are those each having alkyl group containing 4–20 carbon atoms. In this case, examples of the polyol with which the polyol ester is prepared include glycerol, trimethylolethane, trimethylolpropane, pentaerythritol and trishydroxyethyl isocyanurate.

Concrete examples of the dialkyl thiodipropionates include dilauryl thiodipropionate, dimyristyl thiodipropionate and distearyl thiodipropionate.

Furthermore, examples of the esters of the alkylthiopropionic acid with the polyol include glycerine tributylthiopropionate, glycerine trioctylthiopropionate, glycerine trilaurylthiopropionate and glycerine tristearylthiopropionate;

trimethylolethane tributylthiopropionate, trimethylolethane trioctylthiopropionate, trimethylolethane trilaurylthiopropionate and trimethylolethane tristearylthiopropionate; and pentaerythritol tetrabutylthiopropionate, pentaerythritol tetraoctylthiopropionate, pentaerythritol tetralaurylthiopropionate and pentaerythritol tetrastearylthiopropionate.

Among them, preferred are dilauryl thiodipropionate, distearyl thiodipropionate and penterythritol tetralaurylthiopropionate.

The above-mentioned organic thioether stabilizers can be employed singly or in combination.

The first resin composition of the present invention contains the organic thioether stabilizer as described above in an amount of 0.01 to 5 parts by weight, preferably 0.05 to 3 parts by weight, more preferably 0.1 to 1 part by weight based on 100 parts by weight of the thermoplastic resin containing the olefin polymer having an alicyclic structure. In the case where the amount of the organic thioether stabilizer is less than 0.01 part by weight based on 100 parts by weight of the thermoplastic resin containing the olefin polymer having an alicyclic structure, the resin is colored by heating during molding and the resulting molded products cannot be used for optical instrument parts such as optical lenses or optical fibers. Moreover, the molded products have no sufficiently improved thermal deterioration resistance even for use other than optical purposes. In the case where the amount of the organic thioether stabilizer exceeds 5 parts by weight, not only the excellent properties of the thermoplastic resin are deteriorated but also light transmittance thereof for optical use is lowered because of the added organic thioether stabilizer.

The first resin composition of the invention is excellent in thermal stability during molding due to the incorporation of the thermoplastic resin containing the olefin polymer having an alicyclic structure, and specific amounts of the phenolic stabilizer and the organic thioether stabilizer.

The first resin composition may further contain other stabilizers.

The second cycloolefin resin composition of the invention comprises the aforementioned thermoplastic resin containing the olefin polymer having an alicyclic structure, a specific amount of a phenolic stabilizer and a specific amount of an organic phosphite stabilizer, both amounts being based on that of the thermoplastic resin.

As the phenolic stabilizer used for the second cycloolefin resin composition, there can be mentioned those used for the first cycloolefin resin composition.

The second resin composition of the present invention contains a phenolic stabilizer as described above in an amount of 0.01 to 5 parts by weight, preferably 0.05 to 3 parts by weight, more preferably 0.1 to 1 part by weight based on 100 parts by weight or the thermoplastic resin containing the olefin polymer having an alicyclic structure. In the case where the resin composition contains less than 0.01 part by weight of the phenolic stabilizer based on 100 parts by weight of the thermoplastic resin containing the olefin polymer having an alicyclic structure, the resin is colored by heating during molding, and therefore the resultant molded products cannot be used for optical products such as optical lenses and optical fibers. Moreover, the molded products have no sufficiently improved thermal deterioration resistance even for use other than optical purposes. In the case where the amount of the organic phosphite stabilizer exceeds 5 parts by weight, not only the excellent properties of the thermoplastic resin are deteriorated but also light transmittance thereof for optical use is lowered because of the added organic phosphite stabilizer.

The second cycloolefin resin composition of the invention further contains an organic phosphite stabilizer in addition to the above-described phenolic stabilizer.

The organic phosphite stabilizer serves to supplement heat resistance during molding of the resin, imparted by the above-mentioned phenolic stabilizer.

The organic phosphite stabilizers used in the invention are those excluding phosphite stabilizers derived from penterythritol. In the case where there is used a phosphite stabilizer derived from pentaerythritol and represented, for example, by the following formula (1) or (2) for the second cycloolefin resin composition, the compound (stabilizer) is partially decomposed during molding to produce black decomposed products.

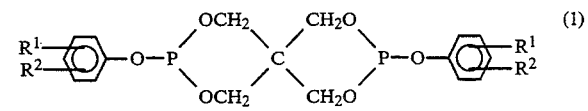

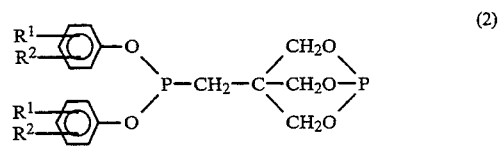

In the formula (1) or (2), each of $R^1$ and $R^2$ represents an alkyl group.

Accordingly, examples of the organic phosphite stabilizers which may be used for the second cycloolefin resin composition of the invention include
trioctyl phosphite,
trilauryl phosphite,
tristridecyl phosphite,
trisisodecyl phosphite,
phenyl diisooctyl phosphite,
phenyl diisodecyl phosphite,
phenyl di(tridecyl) phosphite,
diphenyl isooctyl phosphite,
diphenyl isodecyl phosphite,
diphenyl tridecyl phosphite,
triphenyl phosphite,
tris(nonylphenyl) phosphite,
tris(2,4-di-tert-butylphenyl) phosphite,
tris(butoxyethyl) phosphite,
tetra (tridecyl)-4,4'-butylidenebis(3-methyl-6-tert-butylphenol)-diphosphite,
4,4'-isopropylidene-diphenol alkyl phosphite (alkyl group having approx. 12–15 carbon atoms),
4,4'-isopropylidenebis(2-tert-butylphenol).di(nonylphenyl) phosphite,
tris(biphenyl) phosphite,
tetra(tridecyl)-1,1,3-tris(2-methyl-5-tert-butyl-4-hydroxyphenyl)butane diphosphite,
tetra(tridecyl)-4,4'-butylidenebis(3-methyl-6-tert-butylphenol) diphosphite,
tris (3,5-di-tert-butyl-4-hydroxyphenyl) phosphite,
hydrogenated-4,4'-isopropylidenediphenol polyphosphite,
bis(octylphenyl).bis [4,4'-butylidenebis(3-methyl-6-tert-butylphenol)]-1,6-hexanol diphosphite,
hexatridecyl-1,1,3-tris(2-methyl-4-hydroxy-5-tert-butylphenol) diphosphite,
tris[4,4'-isopropylidenebis(2-tert-butylphenol)]phosphite,
tris(1,3-distearoyloxyisopropyl) phosphite,
9,10-dihydro-9-phosphaphenanthrene-10-oxide, and
tetrakis(2,4-di-tert-butylphenyl) 4,4'-biphenylene diphosphonite.

Among the above-mentioned organic phosphite stabilizers, preferred are tris (2,4-di-tert-butylphenyl) phosphite, tris(nonylphenyl) phosphite and tetrakis (2,4-di-tert-butylphenyl)-4,4'-biphenylene diphosphonite, particularly preferred is tris (2,4-di-tert-butylphenyl) phosphite.

The organic phosphite stabilizers can be employed singly or in combination.

The second cycloolefin resin composition of the present invention contains the organic; phosphite stabilizer as described above in an amount of 0.01 to 5 parts by weight, preferably 0.05 to 3 parts by weight, more preferably 0.1 to 1 part by weight based on 100 parts by weight of the thermoplastic resin containing the olefin polymer having an alicyclic structure. In the case where the amount of the organic phosphite stabilizer is less than 0.01 part by weight based on 100 parts by weight of the thermoplastic resin containing the olefin polymer having an alicyclic structure, the resin is colored by heating during molding and the resulting molded products cannot be used as optical products such as optical lenses or optical fibers. Moreover, the molded products have no sufficiently improved thermal deterioration resistance even for use other than optical purposes. In the case where the amount of the organic phosphite stabilizer exceeds 5 parts by weight, not only the excellent properties of the thermoplastic resin are deteriorated but also light transmittance thereof for optical use is lowered because of the added organic phosphite stabilizer.

Furthermore, it is preferable that the total amount of the phenol stabilizer and the organic phosphite stabilizer is 0.1 to 10 parts by weight based on 100 parts by weight of the olefin polymer having an alicyclic structure.

As described above, the second cycloolefin resin composition of the invention comprises the thermoplastic resin containing the olefin polymer having an alicyclic structure, and specific amounts of a phenolic stabilizer and an organic phosphite stabilizer, and therefore it shows excellent thermal stability during molding.

The second resin composition may further contain other stabilizers.

The third cycloolefin resin composition of the present invention comprises the aforementioned thermoplastic resin containing the olefin polymer having an alicyclic structure, and specific amounts of a phenolic stabilizer, an organic thioether stabilizer and an organic phosphite stabilizer.

In the third cycloolefin resin composition of the invention, heat resistance of the resin composition can be enhanced and coloring thereof caused by thermal decomposition or thermal deterioration of the resin during molding can be effectively prevented owing to the added phenolic stabilizer. In addition, formation of voids, silver streaks and flashes in the resin composition can be effectively prevented.

As the phenolic stabilizer to be incorporated into the third resin composition of the invention, there can be concretely mentioned those compounds described in the illustration of the aforementioned first cycloolefin resin composition.

The phenolic stabilizers can be used singly or in combination.

The third cycloolefin resin composition of the present invention contains the phenolic stabilizer as described above in an amount of 0.01 to 5 parts by weight, preferably 0.05 to 3 parts by weight, more preferably 0.1 to 1 part by weight based on 100 parts by weight of the thermoplastic resin containing the olefin polymer having an alicyclic structure. In the case where the amount of the phenolic stabilizer is less than 0.01 part by weight based on 100 parts by weight of the thermoplastic resin containing the olefin polymer having an alicyclic structure, the resin is colored by heating during molding, and the resulting molded products cannot be used as optical products such as optical lenses or optical fibers. Moreover, the molded products have no suffi-ciently improved thermal deterioration resistance even for use other than optical purposes. In the case where the amount of the phenolic stabilizer exceeds 5 parts by weight, not only the excellent properties of the thermoplastic resin are deteriorated but also light transmittance thereof for optical use is lowered.

The third cycloolefin resin composition of the invention contains an organic phosphite stabilizer in addition to the above-described phenolic stabilizer.

The organic phosphite stabilizer serves to supplement heat resistance of the resin, during molding, imparted by the above-mentioned phenolic stabilizer.

In the third resin composition of the invention, there is no specific limitation on the use of organic phosphite stabilizers because of the use of the organic thioether stabilizer. Examples of the organic phosphite stabilizers for the third resin composition include, in addition to the compounds mentioned in the illustration of the second cycloolefin resin composition of the invention, distearyl pentaerythritol diphosphite,
di(nonylphenyl) pentaerythritol diphosphite,
phenyl.4,4'-isopropylidenediphenol.pentaerythritol diphosphite,
bis(2,4-di-tert-butylphenyl) pentaerythritol diphosphite,
bis(2,6-di-tert-butyl-4-methylphenyl) pentaerythritol diphosphite, and
phenyl bisphenol-A-pentaerythritol diphosphite.

Among them, preferred are tris (2,4-di-tert-butylphenyl) phosphite, tris(nonylphenyl) phosphite, tetrakis (2,4-di-tert-butylphenyl)-4,4'-biphenylene diphosphite, bis(2,6-di-tert-butyl-4-methylphenyl) pentaerythritol diphosphite and bis(2,4-di-tert-butylphenyl) pentaerythritol diphosphite, particularly preferred is tris(2,4-di-tert-butylphenyl) phosphite.

The above-mentioned organic phosphite stabilizers can be employed singly or in combination.

The third cycloolefin resin composition of the present invention contains the organic phosphite stabilizer as described above in an amount of 0.01 to 5 parts by weight, preferably 0.05 to 3 parts by weight, more preferably 0.1 to 1 part by weight based on 100 parts by weight of the thermoplastic resin containing the olefin polymer having an alicyclic structure. In the case where the amount of the organic phosphite stabilizer is less than 0.01 part by weight based on 100 parts by weight of the thermoplastic resin containing the olefin polymer having an alicyclic structure, the resin is colored by heating during molding, and the resulting molded products cannot be used as optical products such as optical lenses or optical fibers. Moreover, the molded products have no sufficiently improved thermal deterioration resistance even for use other than optical purposes. In the case where the amount of the organic phosphite stabilizer exceeds 5 parts by weight, not only the excellent properties of the thermoplastic resin are deteriorated but also light transmittance thereof for optical use is lowered.

An organic thioether stabilizer is also incorporated into the third resin composition of the present invention in addition to the above-described phenolic stabilizer and organic phosphite stabilizer.

As the organic thioether stabilizer used for the third resin composition, there can be mentioned compounds exemplified in the illustration of the first resin composition. The organic thioether stabilizer serves to supplement heat resistance of the resin, during molding, imparted by the above-mentioned phenolic stabilizer.

In the present invention, dialkyl thiodipropionates and esters of an alkylthiopropionic acid with a polyol are preferably employed as the organic thioether stabilizers.

Among them, particularly preferred are dilauryl thiodipropionate, distearyl thiodipropionate and pentaerythritol tetralaurylthiopropionate.

The organic thioether stabilizers can be employed singly or in combination.

The third cycloolefin resin composition of the present invention contains the organic thioether stabilizer as described above in an amount of 0.01 to 5 parts by weight, preferably 0.05 to 3 parts by weight, more preferably 0.1 to 1 part by weight based on 100 parts by weight of the thermoplastic resin containing the olefin polymer having an alicyclic structure. In the Case where the amount of the organic thioether stabilizer is less than 0.01 part by weight based on 100 parts by weight of the thermoplastic resin containing the olefin polymer having an alicyclic structure, the resin is colored by heating during molding, and the resulting molded products cannot be used as optical instrument parts such as optical lenses or optical fibers. Moreover, the molded products have no sufficiently improved thermal deterioration resistance even for use other than optical purposes. In the case where the amount of the organic thioether stabilizer exceeds 5 parts by weight, not only the excellent properties of the thermoplastic resin are deteriorated but also light transmittance thereof for optical use is lowered.

Furthermore, it is preferable that the total amount of the phenolic stabilizer, organic thioether stabilizer and organic phosphite stabilizer is 0.1 to 10 parts by weight based on 100 parts by weight of the thermoplastic resin containing the olefin polymer having an alicyclic structure.

As described above, the third resin composition of the invention comprises the thermoplastic resin containing the olefin polymer having an alicyclic structure, and specific amounts of a phenolic stabilizer, an organic phosphite stabilizer and an organic thioether stabilizer. The resin composition therefore shows excellent thermal stability during molding, and the molded products effectively prevent coloring at the initial stage and with the lapse of time after molding.

The third resin composition may further contain other stabilizers.

The fourth cycloolefin resin composition of the present invention comprises the aforementioned thermoplastic resin containing the olefin polymer having an alicyclic structure and a specifically structured compound having a molecular weight of up to 600 and a free phenolic hydroxyl group.

Since the fourth cycloolefin resin composition of the invention contains a specifically structured compound having a molecular weight of up to 600 and a free phenolic hydroxyl group, the resin composition has improved heat resistance. As a result, formation of voids, silver streaks and flashes as well as thermal decomposition or thermal deterioration of the resin during molding is effectively prevented, and that of fish eyes, agglomerates and foams is especially effectively prevented.

The compound of a specific structure which has a molecular weight of up to 600 and a free phenyl hydroxyl group and which is to be incorporated into the fourth resin composition of the invention is represented by the formula [A] or [B]:

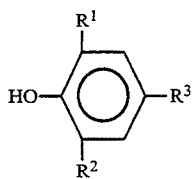

[A]

wherein each of $R^1$ and $R^2$ independently represents a hydrogen atom or an alkyl group having 1–6 carbon atoms, preferably both being a branched alkyl group such as a tert-butyl group, and $R^3$ is a group selected from the group consisting of an alkyl group having 1–22 carbon atoms, an alkoxy group having 1–6 carbon atoms and an alkylamino group having 1–6 carbon atoms, preferably an alkyl group having 1–10 carbon atoms;

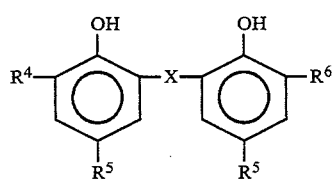

[B]

wherein each of $R^4$ and $R^6$ independently represents an alkyl group having 1–6 carbon atoms, preferably both being a branched alkyl group such as a tert-butyl group, $R^5$ is an alkyl group having 1–6 carbon atoms or an alkoxy group having 1–6 carbon atoms, preferably a branched alkyl group such as a tert-butyl group, and X is a divalent atom or a divalent group selected from the group consisting of an alkylene group, an oxygen atom and a sulfur atom, preferably a divalent group such as a methylene group, an ethylidene group and a butylidene group.

By using such a phenolic stabilizer as having a specific structure and a molecular weight of up to a predetermined amount, the resin composition of the invention tends not to form a cross-linking structure in the polymer by heating during molding. Accordingly, employment of a resin composition containing a phenolic stabilizer as described above makes it possible to produce molded products, which are almost free from fish eyes, etc., such as optical instrument parts, and the thus obtained parts show especially high transparency.

Examples of such phenolic stabilizers include
p-hydroxyanisole,
2-methyl4-isopropylphenol,
2-tert-butyl-4,6-dimethylphenol,
2-tert-butyl4-methoxyphenol,
2,6-di-tert-butylphenol,
p-propylgallate, styrenated mixed cresol,
2,4-di-tert-butyl-5-methylphenol,
3,5-di-tert-butyl-4-hydroxytoluene,
2,5-di-tert-butylhydroxyphenol,
4-hydroxymethyl-2,6-di-tert-butylphenol,
2,6-di-tert-butyl-α-dimethylamino-p-cresol,  butylated bisphenol A,
2,2'-methylene-bis(4-methyl-6-tert-butylphenol),
2-2'-methylene-bis(4,6-di-tert-butylphenol),
2,2'-thio-bis(4-methyl-6-tert-butylphenol),
N-stearoyl-p-aminophenol,
2,2-ethylidene-bis(4,6-di-tert-butylphenol), and
2,2'-methylene-bis(6-α-methylbenzyl-p-cresol).

Among the above-mentioned compounds in the present invention, preferred are 2-tert-butyl-4-methoxyphenol, 2,6-di-tert-butylphenol, 2,4-di-tert-butyl-5-methylphenol, 3,5-di-tert-butyl-4-hydroxytoluene, 2,5-di-tert-butylhydroxyphenol, 4-hydroxymethyl-2,6-di-tert-butylphenol, butylated bisphenol A, 2,2'-methylenebis(4-methyl-6-tert-butylphenol), 2,2'-methylene-bis(4,6-di-tert-butylphenol), 2,2-ethylidenebis(4,6-di-tert-butylphenol), 4,4'-bis(2,6-di-tert-butylphenol), 4,4'-methyl-bis(2,6-di-tert-butylphenol), 2,2'-methylene-bis(6-α-methylbenzyl-p-cresol), 2,2-ethylidene-bis(4-methyl-6-tert-butylphenol) and 2,2'-ethylidenebis(4-ethyl-6-tert-butylphenol); and more preferred are 3,5-di-tert-butyl-4-hydroxytoluene, 2,2'-methylene-bis(4-methyl-6-tert-butylphenol), 2,2'-ethylidene-bis(4,6-di-tert-butylphenol), 2,2'-ethylidene-bis(4-methyl-6-tert-butylphenol) and 2,2'-ethylidenebis(4-ethyl-6-tert-butylphenol).

Those phenolic stabilizers can be employed singly or in combination.

In the fourth resin composition of the present invention, such a phenolic stabilizer as described above is contained in an amount of 0.01 to 5 parts by weight, preferably 0.05 to 4 parts by weight, more preferably 0.1 to 3 parts by weight, most preferably 0.1 to 1 part by weight, based on 100 parts by weight of the amount of the thermoplastic resin containing the olefin polymer having an alicyclic structure. In the case where the resin composition contains the phenolic stabilizer in an amount of less than 0.01 part by weight based on 100 parts by weight of the thermoplastic resin containing the olefin polymer having an alicyclic structure, a crosslinking structure is formed in the resin by heating during molding to produce fish eyes or the like, thereby lowering the light transmittance of the resulting molded products. Accordingly, the resultant molded products cannot be used for optical instrument parts such as optical sheets (e.g., optical cards and substrates of flexible optical discs) or optical fibers. Furthermore, the molded products have no sufficiently improved thermal deterioration resistance for use other than optical purposes. In the case where the resin composition contains more than 5 parts by weight of the phenolic stabilizer, the excellent properties of the above-described thermoplastic resin are deteriorated, and the light transmittance thereof is also lowered.

The fourth cycloolefin resin composition of the invention may further contain other known phenolic antioxidants in addition to the above-mentioned compound of a specific structure having a molecular weight of up to 600 and a free phenolic hydroxyl group.

As the phenolic stabilizers used in the invention in combination with the above-mentioned specific compounds, there can be concretely mentioned the phenolic stabilizers which have been exemplified in the illustration of the above-described first resin composition and in which the above-mentioned specific compounds are excluded.

Since the fourth resin composition of the invention contains the thermoplastic resin containing the olefin polymer having an alicyclic structure and the specific phenolic stabilizer as described above, the resin composition is excellent in heat stability during molding.

The fourth resin composition may further contain other stabilizers.

The fifth cycloolefin resin composition of the invention comprises the aforementioned thermoplastic resin containing the olefin polymer having an alicyclic structure and a phenolic compound of a specific structure.

Since the fifth cycloolefin resin composition of the invention contains a phenolic compound of a specific structure, the resin composition has improved heat resistance. Accordingly, thermal decomposition or thermal deterioration of the resin is effectively prevented during molding. In the manufacture of optical instrument parts, the molded parts are effectively prevented from coloring, and formation of voids, silver streaks, flashes and especially fish eyes, small agglomerates and foams. The phenolic compound to be incorporated into the fifth cycloolefin resin composition is represented by the formula [C]:

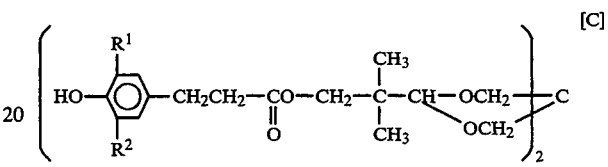

wherein each of R¹ and R² independently represents an alkyl group having 1–6 carbon atoms, and preferably at least one of R¹ and R² is a branched alkyl group such as a tert-butyl group.

By using a phenolic stabilizer of such a specific structure, the resin tends not to form a crosslinking structure by heating during molding. Accordingly, optical instrument parts containing an extremely small amount of fish eyes, etc. are obtained by using the resin composition containing a phenolic stabilizer as described above, and the thus obtained optical parts show especially high transparency. The tendency of producing molded products of high transparency and not suffering formation of fish eyes is not clearly observed even when there is singly used tetrakis [methylene-3-(3,5-di-tert-butyl-4-hydroxyphenyl)propionate]methane having a structure similar to that of a compound represented by the formula [C].

Examples of the compounds having the formula [C] include 3,9-bis[2-{3-(3'-tert-butyl-4-hydroxy-5-methyl-phenyl)propionyloxy}-1,1-dimethylethyl]-2,4,8,10-tetraoxaspiro[5.5]undecane, 3,9-bis[2-{3-(3',5'-di-tert-butyl-4-hydroxyphenyl)propionyloxy}-1,1-dimethylethyl]-2,4,8,10tetraoxaspiro[5.5]undecane, and 3,9-bis[2-{3-(3',5'-dimethyl-4-hydroxyphenyl)propionyloxy}-1,1,dimethylethyl]-2,4,8,10-tetraoxaspiro[5.5]undecane.

The compounds represented by the formula [C] can be employed singly or in combination.

In the fifth resin composition of the present invention, the above-mentioned compound represented by the formula [C] is contained in an amount of 0.01 to 5 parts by weight, preferably 0.05 to 4 parts by weight, more preferably 0.1 to 3 parts by weight, particularly preferably 0.1 to 1 part by weight based on 100 parts by weight of the amount of the thermoplastic resin containing the olefin polymer having an alicyclic structure. In the case where the resin composition contains the compound represented by the formula [C] in an amount of less than 0.01 part by weight based on 100 parts by weight of the thermoplastic resin containing the olefin polymer having an alicyclic structure, a crosslinking structure is formed in the resin by heating during molding to produce fish eyes or the like, thereby lowering the light transmittance of the resulting molded products. Accordingly, the resultant molded products cannot be used for optical instrument parts such as optical sheets (e.g., optical cards and substrates of flexible optical discs) or optical fibers. Furthermore, the molded products have no sufficiently improved thermal deterioration resistance for use other than optical purposes. In the case where the resin composition contains more than 5% by weight of the compound represented by the formula [C], the excellent properties of the above-described thermoplastic resin are deteriorated, and the light transmittance thereof is also lowered by incorporation of the compound.

The fifth cycloolefin resin composition of the invention may further contain other known phenolic antioxidants in addition to the above-mentioned compound represented by the formula [C].

As the phenolic stabilizers used in the invention in combination with the above-mentioned specific compounds, there can be concretely mentioned the phenolic stabilizers which have been exemplified in the illustration of the above-described first resin composition and in which the compounds represented by the formula [C] are excluded.

Since the fifth resin composition of the invention contains the thermoplastic resin containing the olefin polymer having an alicyclic structure and the phenolic stabilizer having a specific structure as described above, the resin composition is excellent in heat stability during molding.

The fifth resin composition may further contain other stabilizers.

In the sixth cycloolefin resin composition of the invention, an organic phosphite stabilizer is incorporated into the aforementioned thermoplastic resin, together with a specific amount of a dialkyl thiodipropionate and/or an ester compound of an alkylthiopropionic acid with a polyol, thereby improving heat resistance of the resin composition, and effectively preventing during molding thermal decomposition and thermal deterioration of the resin, and formation of voids, silver streaks and flashes, etc.

As the dialkyl thiodipropionate and the ester compound of an alkylthiopropionic acid with a polyol, there can be employed those compounds exemplified in the illustration of the first cycloolefin resin composition.

Among the aforementioned compounds, preferred are dilauryl thiodipropionate, distearyl thiodipropionate and pentaerythritol tetralaurylthiopropionate.

Those compounds can be employed singly or in combination.

The sixth resin composition of the present invention contains a dialkyl thiodipropionate and/or an ester of alkylthiopropionic acid with a polyol in an amount of 0.01 to 5 parts by weight, preferably 0.05 to 3 parts by weight, more preferably 0.1 to 1 part by weight based on 100 parts by weight of the amount of the thermoplastic resin containing the olefin polymer having an alicyclic structure. In the case where the resin composition contains the dialkyl thiodipropionate and/or the ester of an alkylthiopropionic acid with a polyol in an amount of less than 0.01 part by weight based on 100 parts by weight of the thermoplastic resin containing the olefin polymer having an alicyclic structure, the resin is colored by heating during molding. The molded products therefore cannot be used for such use requiring high transparency as ;optical lenses and optical fibers. Moreover, the molded products have no sufficiently improved thermal deterioration resistance for use other than optical purposes. In the case where the resin composition contains more than 5 parts by weight of the above-mentioned compound or compounds, the excellent properties of the above-described thermoplastic resin are deteriorated, and the light transmittance thereof is also lowered in optical use due to the incorporation of the organic thioether stabilizer.

As resin stabilizers containing a sulfur atom in the molecule, conventionally used are a series of compounds represented by the following formulas (D) to (G).

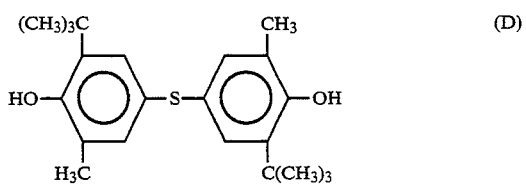

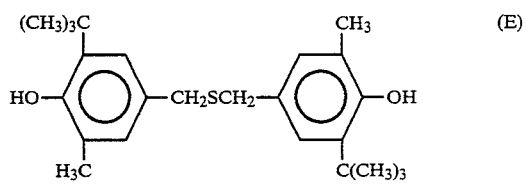

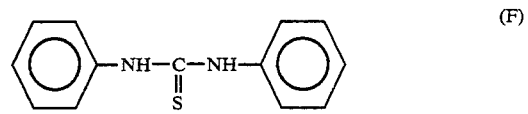

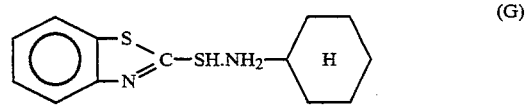

However, molded products obtained by using a resin composition into which one of the compounds represented by the formulas (D) to (G) is incorporated without addition of other stabilizers are colored yellow or black due to the decomposition of the incorporated compound. Accordingly there cannot be obtained optical instrument parts having high transparency and being free from coloring when such a resin composition is employed.

The sixth cycloolefin resin composition of the invention further contains an organic phosphite stabilizer. Examples of the phosphite stabilizers (compounds) used for the sixth resin composition are those compounds described in the aforementioned third cycloolefin resin composition.

Of these organic phosphite stabilizers, preferably employed are tris (2,4-di-tert-butylphenyl) phosphite, tris(nonylphenyl) phosphite, tetrakis (2,4-di-tert-butylphenyl) 4,4'-biphenylene diphosphite, distearyl pentaerythritol diphosphite, di(nonylphenyl) pentaerythritol diphosphite, phenyl.4,4'-isopropylidenediphenol pentaerythritol diphosphite, bis(2,4-di-tert-butylphenyl) pentaerythritol diphosphite, bis(2,6-di-tert-butyl-4-methylphenyl) pentaerythritol diphosphite, and phenyl bisphenol A-pentaerythritol diphosphite. Particularly preferred are tris (2,4-di-tert-butylphenyl) phosphite, bis(2,4-di-tert-butylphenyl) pentaerythritol diphosphite, and bis(2,6-di-tert-butyl-4-methylphenyl) pentaerythritol diphosphite.

The organic phosphite stabilizers can be employed alone or in combination.

The sixth cycloolefin resin composition of the present invention contains such an organic phosphite stabilizer as described above in an amount of 0.01 to 5 parts by weight, preferably 0.05 to 3 parts by weight, more preferably 0.1 to 1 part by weight based on 100 parts by weight of the amount of the thermoplastic resin containing the olefin polymer having an alicyclic structure. In the case where the resin composition contains the organic phosphite stabilizer in an amount of less than 0.01 part by weight based on 100 parts by weight of the thermoplastic resin containing the olefin polymer having an alicyclic structure, the resin is colored by heating during molding, and therefore the molded products cannot be used as optical instrument parts such as optical lenses and optical fibers. Moreover, the molded products have no sufficiently improved thermal deterioration resistance for use other than optical purposes. In the case where the resin composition contains more than 5 parts by weight of the organic phosphite stabilizer, the excellent properties of the above-described thermoplastic resin are deteriorated, and the light transmittance thereof for optical use is also lowered due to the incorporation of the stabilizer.

The sixth cycloolefin resin composition of the invention contains a dialkyl thiodipropionate and/or an ester of alkylthiopropionic acid with a polyol, and an organic phosphite stabilizer in a total amount of usually up to 10 parts by weight, preferably 0.1–5 parts by weight based on 100 parts by weight of the thermoplastic resin.

The sixth cycloolefin resin composition of the invention contains, as described above, the thermoplastic resin containing the olefin polymer having an alicyclic structure, dialkyl thiodipropionate and/or an ester of an alkylthiopropionic acid with a polyol and an organic phosphite stabilizer, and therefore it is excellent in thermal stability during molding.

The sixth resin composition may further contain other stabilizers.

The above-described first to sixth resin compositions according to the present invention contain the thermoplastic resin containing the olefin polymer having an alicyclic structure and specific amounts of specific stabilizers as described above, and therefore they are excellent in heat stability during molding. A resin composition prepared by further incorporation of a metal salt of a higher aliphatic acid into the resin composition, that is an aliphatic acid salt-containing resin composition, shows improved thermal stability of the resin during injection molding. The resultant molded products such as optical instrument parts are less colored.

In other words, a seventh resin composition of the invention, an aliphatic acid salt-containing resin composition, is a resin composition prepared by further incorporating a metal salt of a higher aliphatic acid into either one of the above-described first to sixth cycloolefin resin compositions.

The incorporation of the higher aliphatic acid metal salt improves thermal stability of the resultant resin during molding, and prevents corrosion of the molding machine caused by chlorine gas evolved from catalyst remaining in an olefin polymer having an alicyclic structure in the case of using such a catalyst containing chlorine atoms as Ziegler catalyst during the manufacture of the olefin polymer.

The incorporation of the higher aliphatic acid metal salt therefore prevents coloring of the molded products caused by introduction of rust, etc. thereinto.

Examples of the higher aliphatic acid metal salts which may be used in the invention include alkali metal salts, alkaline earth metal salts and other metal salts of saturated or unsaturated carboxylic acids having 12–40 carbon atoms. The above-described saturated or unsaturated carboxylic acids having 12–40 carbon atoms may have substituent groups such as a hydroxyl group. As the saturated or unsaturated carboxylic acids having 12–40 carbon atoms, there can be concretely mentioned higher aliphatic acids such as stearic acid, oleic acid, lauric acid, capric acid, arachidic acid, palmitic acid, behenic acid, 12-hydroxystearic acid and montanic acid. Examples of metals forming salts by reaction with these higher aliphatic acids include alkaline earth metals (e.g., magnesium, calcium and barium), alkali metals (e.g., sodium, potassium and lithium), cadmium, zinc and lead.

Concrete examples of the higher aliphatic acid metal salts include magnesium stearate, magnesium laurate, magnesium palmitate, calcium stearate, calcium oleate, calcium laurate, barium stearate, barium oleate, barium laurate, barium arachidate, barium behenate, zinc stearate, zinc oleate, zinc laurate, lithium stearate, sodium stearate, sodium palmitate, sodium laurate, potassium stearate, potassium laurate, calcium 12-hydroxystearate, sodium montanate, calcium montanate and zinc montanate.

Of these, particularly preferred are zinc salts of saturated aliphatic acids having 12–35 carbon atoms.

These higher aliphatic acid metal salts may be used singly or in combination.

The aliphatic acid salt-containing resin composition according to the invention contains such a higher aliphatic acid metal salt as described above in an amount of 0.01 to 1 part by weight, preferably 0.01 to 0.5 part by weight, more preferably 0.01 to 0.1 part by weight based on 100 parts by weight of the thermoplastic resin containing the olefin polymer having an alicyclic structure. In the case where the resin composition contains the higher aliphatic acid metal salt in an amount of less than 0.01 part by weight based on 100 parts by weight of the thermoplastic resin containing the olefin polymer having an alicyclic structure, the optical instrument parts such as optical lenses or optical fibers prepared from the resin composition of the invention sometimes suffer coloring caused by rust when there is used an olefin polymer having an alicyclic structure prepared by polymerization with catalyst containing chlorine atoms. In the case where the resin composition contains the higher aliphatic acid metal salt in an amount of more than 1 part by weight, the excellent properties of the thermoplastic resin are deteriorated, and the molding products show lowering of light transmittance when used as optical parts.

The total amount of the above-mentioned stabilizers in each of the aliphatic acid salt-containing resin compositions is generally not more than 10 parts by weight, preferably in the range of 0.1 to 5 parts by weight based on 100 parts by weight of the thermoplastic resin.

The eighth cyclic olefin resin composition of the present invention is prepared by further incorporating an UV-ray absorber and/or a hindered amine stabilizer into the first to seventh cyclic olefin resin compositions of the invention.

Deterioration caused by light of the cyclic olefin resins can be prevented by incorporation of such an UV-ray absorber and/or a hindered amine stabilizer.

Examples of the UV-ray absorbers used in the present invention are listed below. Hydroxybenzophenones such as
2-hydroxy-4-methoxybenzophenone,
2-hydroxy-4-n-octoxybenzophenone,
2-hydroxy-4-methoxybenzophenone,
2,2'-dihydroxy-4-n-octoxybenzophenone,
2,4-dihydroxybenzophenone,
2,2',4,4'-tetrahydroxybenzophenone, and
2,2'-dihydroxy-4,4'-dimethoxybenzophenone; Benzotriazoles such as
2-(2'-hydroxy-3'-tert-butyl-5'-methylphenyl)5-chlorobenzotriazole,
2-(2'-hydroxy-3',5'-di-tert-butylphenyl)-5-chlorobenzotriazole,
2-(2'-hydroxy-5'-tert-methylphenyl)benzotriazole,
2-(2'-hydroxy-3',5'-di-tert-butylphenyl)-5chlorobenzotriazole,
2-(2'-hydroxy-5'-tert-octylphenyl)benzotriazole,
2-(2'-hydroxy-3',5'-di-tert-amylphenyl)benzotriazole,
2-(2'-hydroxy-3',5'-di-tert-butylphenyl)benzotriazole,
2-[2'-hydroxy-3',5'-bis($\alpha,\alpha$-dimethylbenzyl)]benzotriazole,
2-[2'-hydroxy-3'-(3'',4'',5'',6''-tetrahydrophthaloidmethyl)-5'-methylphenyl]benzotriazole, and
2,2'-methylenebis[4-(1,1,3,3-tetramethylbutyl)-6-(2H-benzotriazole-2-yl)phenol];
Condensation products of methyl-3-[3-tert-butyl-5-(2H-benzotriazole-2-yl)-4-hydroxyphenyl]propionate and polyethylene glycol (molecular weight about 300); Benzoates such as
phenyl salicylate,
p-tert-butylphenyl salicylate,
2,4-di-tert-butylphenyl 3,5-di-tert-butyl-4-hydroxybenzoate, and
hexadecyl 3,5-di-tert-butyl-4-hydroxybenzoate; Nickel compounds such as
2,2'-thiobis(4-tert-octylphenol) Ni salt
[2,2'-thiobis(4-tert-octylphenolato)]-n-butylamine nickel salt,
(3,5-di-tert-butyl-4-hydroxybenzyl)phosphonic acid monooctyl ester nickel salt, and
dibutyldithiocarbamic acid nickel salt;
Substituted acrylonitriles such as
$\alpha$-cyano-$\beta$-methyl-$\beta$-(p-methoxyphenyl) acrylic acid methyl ester, and
$\alpha$-cyano-$\beta,\beta$-diphenylacrylic acid methyl ester; and
Oxalic acid dianilides such as
N-2-ethylphenyl-N'-2-ethoxy-5-tert-phenyloxalic acid diamide, and
N-2-ethylphenyl-N'-2-ethoxyphenyloxalic acid amide.

Examples of the hindered amine stabilizers are listed below.
(1) Bis(2,2,6, 6-tetramethyl-4-piperidyl) sebacate, Examples of the hindered amine stabilizers are listed below.
(1) Bis(2,2,6, 6-tetramethyl-4-piperidyl) sebacate,
(2) Dimethyl succinate-1-(2-hydroxyethyl)-4-hydroxy-2,2,6, 6-tetramethylpiperidine polycondensate,
(3) Poly[[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imino],
(4) Tetrakis(2, 2,6,6-tetramethyl-4-piperidyl)-1,2,3,4-butanetetracarboxylate,
(5) 2,2,6,6-Tetramethyl-4-piperidyl benzoate
(6) Bis-(1,2,6,6-pentamethyl-4-piperidyl)-2-(3,5-di-tert-butyl-4-hydroxybenzyl)-2-n-butyl malonate,
(7) Bis-(N-methyl-2,2,6,6-tetramethyl-4-piperidyl) sebacate,
(8) 1,1'-(1,2-Ethanediyl) bis(3,3,5,5-tetramethylpiperazinone),
(9) (Mixed 2, 2,6,6-tetramethyl-4-piperidyl/tridecyl)-1,2,3,4-butanetetracarboxylate,
(10) (Mixed 1,2,2,6,6-pentamethyl-4-piperidyl/tridecyl) 1,2,3,4-butanetetracarboxylate,
(11) Mixed {2,2,6,6-tetramethyl-4-piperidyl/$\beta,\beta,\beta',\beta'$-tetramethyl-3,9-[2,4,8,10-tetraoxasprio(5,5)undecane]-diethyl}-1,2,3,4-butanetetracarboxylate,
(12) Mixed {1,2,2,6,6-pentamethyl-4-piperidyl/$\beta,\beta,\beta',\beta'$-tetramethyl-3,9-[2,4,8,10-tetraoxaspiro (5,5)-undecane]diethyl}-1,2,3,4-butanetetracarboxylate,
(13) N,N'-Bis(3-aminopropyl)ethylenediamine-2,4-bis [N-butyl-N-(1,2,2,6,6-pentamethyl-4-piperidyl) amino]-6-chloro-1,3,5-triazine condensate,
(14) Poly[6-N-morpholyl-1,3,5-triazine-2,4-diyl-]-[(2,2,6,6-tetramethyl-4-piperidyl)imino]hexamethylene[(2,2,6,6-tetramethyl-4-piperidyl)imino]],
(15) Condensate of N,N'-bis(2,2,6,6-tetramethyl-4-piperidyl)hexamethylenediamine with 1,2-dibromoethane, and
(16) [N-(2,2,6,6-tetramethyl-4-piperidyl)-2'methyl-2-(2,2,6,6-tetramethyl-4-piperidyl)imino]propionamide.

Among the hindered amine stabilizers, those especially preferably employed are listed below.
(2) Dimethyl succinate-1-(2-hydroxyethyl)-4-hydroxy-2,2,6,6-tetramethylpiperidine polycondensate,
(3) Poly[[6-(1,1,3,3-tetramethylbutyl)imino-1,3,5-triazine-2,4-diyl][(2,2,6,6-tetramethyl-4-piperidyl)imino]-hexamethylene[(2,2,6,6-tetramethyl-4piperidyl)imino],
(4) Tetrakis(2, 2,6,6-tetramethyl-4-piperidyl)-1, 2,3,4-butanetetracarboxylate,
(6) Bis(1,2,6,6-pentamethyl-4-piperidyl)-2-(3,5-di-tert-butyl-4-hydroxybenzyl)-2-n-butyl malonate,
(8) 1,1'-(1, 2-Ethanediyl)bis(3,3,5,5-tetramethylpiperazinone),
(9) (Mixed 2,2,6,6-tetramethyl-4-piperidyl/tridecyl) 1,2,3,4-butanetetracarboxylate,
(10) (Mixed 1, 2,2,6,6-pentamethyl-4-piperidyl/tridecyl) 1,2,3,4-butanetetracarboxylate,
(11) Mixed {2,2,6,6-tetramethyl-4-piperidyl/$\beta,\beta,\beta',\beta'$-tetramethyl-3,9-[2,4,8,10-tetraoxasprio(5,5)undecane]diethyl}-1,2,3,4-butanetetracarboxylate,
(12) Mixed {1,2,2,6,6-pentamethyl-4-piperidyl/$\beta,\beta,\beta',\beta'$-tetramethyl-3,9-[2,4,8, 10-tetraoxaspiro(5,5)undecane]diethyl}-1,2,3,4butanetetracarboxylate,
(13) N,N'-Bis(3-aminopropyl)ethylenediamine-2,4-bis[N-butyl-N-(1,2,2,6,6-pentamethyl-4-piperidyl)amino-]-6-chloro-1,3,5-triazine condensate,
(14) Poly[6-N-morpholyl-1,3,5-triazine-2,4-diyl][(2,2,6,6-tetramethyl-4-piperidyl)imino]hexamethylene[(2,2,6,6-tetramethyl-4-piperidyl)imino],
(15) Condensate of N,N'-bis(2,2,6,6-tetramethyl-4-piperidyl)hexamethylenediamine with 1,2-dibromoethane, and
(16)[N-(2,2,6,6-tetramethyl-4-piperidyl)-2'-methyl-2-(2,2,6,6-tetramethyl-4-piperidyl)imino]propionamide.

The eighth cycloolefin resin composition of the present invention comprises 0.01-2.0 parts by weight, preferably 0.05-1.0 part by weight of an UV-ray absorber and/or a hindered amine stabilizer based on 100 parts by weight of the thermoplastic resin containing the olefin polymer having an alicyclic structure. The incorporation of an UV-ray absorber and/or a hindered amine stabilizer in an amount described above effectively prevents lowering of the mechanical strength and coloring of the molded products even when the molded products are exposed to sunlight over a long period of time.

The incorporation of either one of an UV-ray absorber or a hindered amine stabilizer is satisfactory for preparing the eighth cycloolefin resin composition of the invention, and both the absorber and the stabilizer may also be incorporated simultaneously. In the case where both stabilizers are incorporated, the incorporation ratio of the UV-ray absorber to the hindered amine stabilizer is usually in the range of 1:99–99:1, though the ratio may be appropriately decided.

The resin compositions of the invention may contain such components usually incorporated into polyolefins as an aliphatic acid ester of a polyol, a heat-resistant stabilizer, a dye, a lubricant and a neutron shielding agent in addition to the above-described stabilizers so long as they do not impair the object of the invention.

The aliphatic acid ester of a polyol used in the invention is a compound obtained by partially esterifying alcoholic hydroxyl groups of the polyol. The incorporation of the ester effectively prevents lowering of the transparency of optical instrument parts with the lapse of time.

Concrete examples of aliphatic acid esters of polyols are listed below.

Aliphatic acid esters of glycerine such as glycerine monostearate, glycerine monolaurate, glycerine monomyristate, glycerine monopalmitate, glycerine distearate, and glycerine dilaurate; and Aliphatic acid esters of pentaerythritol such as pentaerythritol monostearate, pentaerythritol monolaurate, pentaerythritol distearate, pentaerythritol dilaurate and pentaerythritol tristearate.

The resin compositions of the invention can be prepared by incorporating stabilizers into the above-described thermoplastic resin containing the olefin polymer having an alicyclic structure, the incorporation being carried out by a conventional method. For example, the thermoplastic resin and the stabilizers are mixed and then kneaded by a kneader. The mixing is conducted, for example, by a ribbon blender, tumbler blender or Henschel mixer, and the kneading is conducted, for example, by an extruder, Banbury mixer or twin rolls.

The resin compositions of the invention may also be prepared by dispersing or dissolving the above-mentioned stabilizers into a hydrocarbon solvent or aromatic solvent, adding the resultant solution or dispersion to a separately prepared organic solvent solution or dispersion of the thermoplastic resin, and mixing the resultant material.

The thus obtained resin compositions of the invention are injection molded by using, for example, a belt-type extruder, twin screw extruder, three-screw extruder, conical twin screw extruder, cokneader, platificator, mixed ruder, biaxial conical screw extruder, planetary screw extruder, gear extruder and screwless extruder, to produce resin molded products such as optical instrument parts (for example, optical lenses and optical fibers), mechanical parts, electronic parts and automobile parts.

Other optical instrument parts having desired forms such as a sheet form can be produced by using a molding machine such as-an inflation molding machine, T-die molding machine and press molding machine.

The resin compositions of the invention contain a specific thermoplastic resin and specific stabilizers in specific amounts as described above, and therefore they show significantly excellent heat stability during molding. Moreover, the molded products show significantly stabilized weathering resistance, and do not substantially vary in the resin characteristics even when used over a long period of time. Hence, optical instrument parts which are free from being colored and has very high transparency can be obtained by using the resin compositions of the invention.

Furthermore, the aliphatic acid salt-containing resin compositions of the invention prepared by incorporating a higher aliphatic acid metal salt into the above-mentioned resin compositions effectively prevent a molding machine used for molding the resin compositions from rust formation caused by chlorine gas generated from catalyst remaining in the thermoplastic resin of the resin compositions when the thermoplastic resin thereof has been prepared by using such catalyst containing chlorine atoms as Ziegler catalyst.

Accordingly, the resin compositions of the invention are very suitable for producing optical instrument parts requiring extremely high transparency such as optical lenses and filaments of optical fibers. Moreover, the resin compositions are favorably used for optical disc substrates requiring relatively high transparency, though the optical discs do not need such a high level of transparency as required for the optical lenses or filaments of optical fibers.

Furthermore, the resin compositions of the invention can be used not only for the above-described optical purposes but also for raw materials for manufacturing various molded products. Especially, the above-described resin compositions containing a flexible polymer have significantly improved impact resistance due to the use of the flexible polymer and the olefin polymer having an alicyclic structure in combination. The resin compositions also have significantly improved thermal aging resistance and weathering resistance due to the incorporation of specific stabilizers. The resin compositions of the present invention therefore can be used not only for optical use but also for a wide range of use such as use requiring ordinary transparency and use requiring good mechanical strength such as impact resistance and no transparency.

EFFECTS OF THE INVENTION

The resin compositions of the invention contain the above-described specific stabilizers in specific amounts, whereby the resin is hardly burned during molding, and there is decreased conjugated double bond formation caused by oxidation of the alicyclic structure within the molecule of the olefin polymer. The resin compositions do not deteriorate in their physical properties even after being exposed to sunlight outdoors over a long period. Accordingly, optical instrument parts prepared from the resin compositions of the invention are not easily colored, and do not lose their transparency inherent to thermoplastic resin compositions containing an olefin polymer having an alicyclic structure. Moreover, formation of voids or flashes is decreased in the optical instrument parts.

Furthermore, optical instrument parts having the above-mentioned excellent characteristics can be prepared from the aliphatic acid salt-containing resin compositions of the invention, and the resin compositions effectively prevent, in an apparatus such as a molding machine, rust formation caused by a chlorine component remaining in the resin in the case of using Ziegler catalyst during the resin manufacture. Optical instrument parts prepared from the resin compositions of the present invention are not colored with rust formed in the molding machine even when a resin containing a chlorine component is used.

Still furthermore, the cycloolefin resin compositions containing the flexible polymer of the invention are excellent in mechanical characteristics such as impact resistance and thermal aging resistance. They are also excellent in weathering resistance.

EMBODIMENT

Examples of the present invention and comparative examples are given below, but those examples are by no means understood to restrict the invention.

The term "parts" used in the examples and the comparative examples means "parts by weight" unless specifically defined.

Furthermore, the thermal aging resistance and weathering resistance of the resin compositions in the present invention were evaluated by preparing test pieces from resin compositions prepared in the following examples, allowing the test pieces to stand in a predetermined environment, and determining Izod impact strength and bending strength of the test pieces.

The testing procedure is described below.

TESTING PROCEDURE

Aging resistance: The test pieces were allowed to stand in a Geer oven having an air atmosphere at 125° C. for a predetermined period, and the aging resistance was evaluated by determining Izod impact strength and bending strength thereof.

Weathering resistance: The test pieces were irradiated with light for a predetermined period by a xenon weather meter [UV-ray (wavelength 300–400 nm) radiation intensity: 6.6 mW/cm$^2$, rain fall, black panel temperature: 83° C.], and the weathering resistance was evaluated by determining Izod impact strength and surface brightness (gloss).

Physical test
Izod impact strength: JIS-K7100, with a notch, Bending strength: JIS-K7203, and Gloss: JIS-K7105

Examples 1 to 8 and Comparative Examples 1 to 6

To an ethylene/tetracyclododecene copolymer (ethylene repeating unit content: 60 mol %, melt flow index: 35 g/10 min (ASTM D1238)) were added various stabilizers set forth in Table 1-1 in amounts also set forth in Table 1-1, and they were mixed by a Henschel mixer. The resulting mixture was pelletized by a twin screw extruder having a screw diameter of 20 mm at a temperature of 230° C.

The pellets were molded by a press molding machine to form sheets having a thickness of 2 mm. Each of the obtained sheets was measured on a Hunter color difference (values of L, a and b) to evaluate the coloring properties.

The sheets were aged in an oven at 100° C., and the coloring degree thereof was measured with the lapse of time.

The results are set forth in Table 1–2.

TABLE 1-1

| | Stabilizer (wt. %) | | | | | | | | | | | |
|---|---|---|---|---|---|---|---|---|---|---|---|---|
| | Phenolic | | | | | | | Sulfur | | Phosphorus | | Metal salt |
| | A | B | C | D | E | F | G | H | I | J | K | L |
| Example 1 | 0.6 | — | — | — | — | — | — | 0.6 | — | — | — | 0.05 |
| Example 2 | 0.6 | — | — | — | — | — | — | 0.6 | — | — | — | — |
| Com. Example 1 | — | — | — | — | — | — | — | — | — | — | — | — |
| Com. Example 2 | 0.6 | — | — | — | — | — | — | — | — | — | — | — |
| Com. Example 3 | 1.2 | — | — | — | — | — | — | — | — | — | — | — |
| Com. Example 4 | — | — | — | — | — | — | — | 1.2 | — | — | — | — |
| Example 3 | 0.6 | — | — | — | — | — | — | — | — | 0.6 | — | 0.05 |
| Example 4 | 0.6 | — | — | — | — | — | — | — | — | 0.6 | — | — |
| Com. Example 5 | — | — | — | — | — | — | — | — | — | 0.6 | — | — |
| Com. Example 6 | — | — | — | — | — | — | — | — | — | 1.2 | — | — |
| Example 5 | 0.3 | — | — | — | — | — | — | 0.6 | — | 0.3 | — | 0.05 |
| Example 6 | 0.3 | — | — | — | — | — | — | 0.6 | — | 0.3 | — | — |
| Example 7 | — | — | — | — | — | — | — | 0.6 | — | 0.6 | — | 0.05 |
| Example 8 | — | — | — | — | — | — | — | 0.6 | — | 0.6 | — | — |

Note:
In the above table, the amount of incorporated stabilizers are expressed in terms of parts by weight based on 100 parts by weight of the thermoplastic resin.

Furthermore, symbols used in Table 1-1, and Examples and Comparative Examples to be described hereinafter represent the following compounds.

Phenolic stabilizers
A: 2,6-di-tert-butyl-4-methylphenol
B: tetrakis[methylene-3-(3,5-di-tert-butyl-4-hydroxyphenyl)propionate]methane
C: 1,3,5-trimethyl-2,4,6-tris(3,5-di-tert-butyl-4-hydroxybenzyl)benzene
D: tris(4-tert-butyl-2,6-dimethyl-3-hydroxybenzyl)isocyanurate
E: 2,2'-oxamidobis[ethyl-3-(3,5-di-tert-butyl-4-hydroxyphenyl)propionate]
F: 2,2'-ethylidenebis(4,6-di-tert-butylphenol)
G: 3,9-bis[1,1-dimethyl-2-{β-(3-tert-butyl-4-hydroxy-5-methylphenyl)propionyloxy}ethyl[-5.5]undecane
Thioether stabilizers
H: pentaerythritol tetralaurylthiopropionate
I: distearyl thiodipropionate
Phosphite stabilizers
J: tris (2,4-di-tert-butylphenyl) phosphite
K: tetrakis(2,4-di-tert-butylphenyl)4,4'-biphenylene diphosphonite
Aliphatic acid stabilized
L: zinc stearate

TABLE 1-2

| | Initial | | | After 500 hr | | | After 1000 hr | | |
|---|---|---|---|---|---|---|---|---|---|
| | L | a | b | L | a | b | L | a | b |
| Example 1 | 98 | −0.3 | 1.1 | 98 | −0.5 | 2.0 | 96 | −2.0 | 3.5 |
| Example 2 | 98 | −0.3 | 1.2 | 97 | −0.6 | 2.2 | 95 | −2.2 | 4.0 |
| Com. Example 1 | 98 | −0.3 | 1.1 | 95 | −4.5 | 13.3 | 92 | −6.9 | 24.0 |
| Com. Example 2 | 97 | −0.4 | 2.4 | 96 | −2.0 | 3.8 | 94 | −3.0 | 8.0 |
| Com. Example 3 | 97 | −0.4 | 2.4 | 96 | −1.5 | 3.5 | 95 | −2.8 | 7.5 |

TABLE 1-2-continued

| | Initial | | | After 500 hr | | | After 1000 hr | | |
|---|---|---|---|---|---|---|---|---|---|
| | L | a | b | L | a | b | L | a | b |
| 3 | | | | | | | | | |
| Com. Example 4 | 98 | −0.3 | 1.8 | 96 | −2.0 | 5.0 | 94 | −3.2 | 10.2 |
| Example 3 | 98 | −0.3 | 1.3 | 98 | −0.5 | 2.1 | 96 | −2.1 | 3.3 |
| Example 4 | 98 | −0.3 | 1.4 | 97 | −0.6 | 2.2 | 96 | −2.3 | 3.5 |
| Com. Example 5 | 98 | −0.3 | 1.5 | 96 | −1.8 | 4.5 | 94 | −2.9 | 7.0 |
| Com. Example 6 | 98 | −0.3 | 1.5 | 96 | −1.7 | 4.0 | 95 | −2.8 | 6.5 |
| Example 5 | 98 | −0.2 | 1.0 | 98 | −0.5 | 1.8 | 97 | −1.5 | 3.0 |
| Example 6 | 98 | −0.3 | 1.1 | 98 | −0.6 | 2.0 | 97 | −1.7 | 3.2 |
| Example 7 | 98 | −0.2 | 1.3 | 97 | −0.7 | 2.2 | 96 | −2.3 | 4.2 |
| Example 8 | 98 | −0.3 | 1.4 | 97 | −0.8 | 2.5 | 95 | −2.5 | 4.5 |

Examples 9–18 and Comparative Examples 7–9

To an ethylene/tetracyclododecene copolymer (ethylene repeating unit content: 60 mol %, melt flow index: 35 g/10 min (ASTM D1238)) stabilizers represented in Table 2 were added in amounts described in Table 2, and the copolymer and stabilizers were mixed by a Henschel mixer. The mixture was pelletized at 230° C. by a twin extruder having a screw diameter of 20 mm. Films each 30 μm thick were prepared from the pellets by an inflation film molding machine having a screw diameter of 20 mm.

The films were image processed to determine a number per unit area (mm²) of fish eyes each having a diameter of at least 10 μm.

The results are shown in Table 2.

TABLE 2

| | Stabilizer (wt. %) | | | | | Results Fish eyes (Dia. at least 10 μm, number/mm²) |
|---|---|---|---|---|---|---|
| | Phenolic | | | | Metal salt | |
| | A | B | F | G | L | |
| Example 9 | — | — | 1.2 | — | 0.05 | 40 |
| Example 10 | 1.2 | — | — | — | 0.05 | 60 |
| Example 11 | 0.6 | — | 0.6 | — | 0.05 | 20 |
| Example 12 | — | 0.6 | 0.6 | — | 0.05 | 80 |
| Example 13 | — | — | 1.2 | — | — | 35 |
| Com. Example 7 | — | — | — | — | 0.05 | at least 500 |
| Com. Example 8 | — | — | — | — | — | 200 |
| Com. Example 9 | — | 1.2 | — | — | — | 200 |
| Example 14 | — | — | — | 1.2 | 0.05 | 60 |
| Example 15 | 0.6 | — | — | 0.6 | 0.05 | 40 |
| Example 16 | — | 0.6 | — | 0.6 | 0.05 | 90 |
| Example 17 | — | — | 0.6 | 0.6 | 0.05 | 30 |
| Example 18 | — | — | — | 1.2 | — | 50 |

Note:
In the above table, the amounts of incorporated stabilizers are expressed in terms of parts by weight based on 100 parts by weight of thermoplastic resin.

Examples 19 to 27 and Comparative Examples 10 to 13

There were mixed an ethylene/tetracyclododecene copolymer, an ethylene/propylene copolymer, divinylbenzene and 2,5-dimethyl-2,5-di(tert-butylperoxy)hexene-3, the copolymers having characteristics described below.

The mixing weight proportion was as follows:
ethylene/tetracyclododecene copolymer 85 parts;
ethylene/propylene copolymer 15 parts;
divinylbenzene 0.3 part; and
2,5-dimethyl-2,5-di(tert-butylperoxy)hexene-3 0.1 part.

Characteristics of the ethylene/tetracyclododecene copolymer and the ethylene/propylene copolymer are described below.

Characteristics of the ethylene/tetracyclododecene copolymer:
Ethylene repeating unit content: 64 mol %,
Melt flow index (load of 2.16 kg, 260° C.): 35 g/min,
Intrinsic viscosity [η] (130° C. in decalin): 0.47 dl/g, and
Softening temperature (TMA): 148° C.

Characteristics of the ethylene/propylene copolymer:
Ethylene repeating unit content: 80 mol % and
Melt flow index (load of 2.16 kg, 190° C.): 0.4 g/min.

To the mixture having composition described above were added stabilizers listed in Table 3-1 in amounts described in Table 3-1, and each of the obtained mixture was pelletized by melt kneading at 230° C. by a twin extruder having a screw diameter of 30 mm.

The pellets were injection molded at a cylinder temperature of 270° C. and a mold temperature of 90° C. to produce test pieces.

The thermal aging resistance of the resultant test pieces was evaluated by determining Izod impact resistance and bending strength.

In the present invention, the thus obtained test pieces were allowed to stand in a Geer oven having an air atmosphere at 125° C. for a predetermined period, and the Izod impact strength (JIS-K-7100, with a notch) and bending strength (JIS-K-7203) thereof were measured. The thermal aging resistance thereof was evaluated from these values.

The results are shown in Table 3-2.

TABLE 3-1

| | Stabilizer (wt. %) | | | | | | | |
|---|---|---|---|---|---|---|---|---|
| | Phenolic | | | | Sulfur | | Phosphorus | |
| | B | C | D | E | H | I | J | K |
| Example 19 | 0.1 | — | — | — | 0.1 | — | — | — |
| Example 20 | — | 0.1 | — | — | — | 0.1 | — | — |
| Example 21 | — | — | 0.1 | — | — | 0.1 | — | — |
| Example 22 | — | — | — | 0.1 | — | 0.1 | — | — |
| Example 23 | 0.1 | — | — | — | — | — | — | 0.1 |
| Example 24 | 0.1 | — | — | — | — | — | 0.1 | — |
| Example 25 | 0.1 | — | — | — | — | 0.1 | — | 0.1 |
| Example 26 | 0.1 | — | — | — | 0.1 | — | 0.1 | — |
| Example 27 | — | 0.1 | — | — | 0.1 | — | 0.1 | — |
| Com. Example 10 | — | — | — | — | — | — | — | — |
| Com. Example 11 | 0.1 | — | — | — | — | — | — | — |
| Com. Example 12 | — | — | — | — | — | 0.1 | — | — |
| Com. Example 13 | — | — | — | — | — | — | — | 0.1 |

Note:
In the above table, the amounts of incorporated stabilizers are expressed in terms of parts by weight based on 100 parts by weight of thermoplastic resin.

TABLE 3-2

| | Initial strength | | Strength after 6 weeks | | Strength after 12 weeks | |
|---|---|---|---|---|---|---|
| | Izod impact (kg · cm/cm) | Bending (kg/cm²) | Izod impact (kg · cm/cm) | Bending (kg/cm²) | Izod impact (kg · cm/cm) | Bending (kg/cm²) |
| Example 19 | 15 | 740 | 14 | 750 | 13 | 740 |
| Example 20 | 15 | 740 | 14 | 740 | 12 | 750 |
| Example 21 | 15 | 750 | 14 | 750 | 12 | 740 |
| Example 22 | 15 | 730 | 14 | 740 | 13 | 750 |

TABLE 3-2-continued

|  | Initial strength | | Strength after 6 weeks | | Strength after 12 weeks | |
|---|---|---|---|---|---|---|
|  | Izod impact (kg · cm/cm) | Bending (kg/cm²) | Izod impact (kg · cm/cm) | Bending (kg/cm²) | Izod impact (kg · cm/cm) | Bending (kg/cm²) |
| Example 23 | 15 | 760 | 14 | 750 | 12 | 740 |
| Example 24 | 15 | 750 | 14 | 740 | 13 | 750 |
| Example 25 | 15 | 750 | 15 | 740 | 15 | 750 |
| Example 26 | 15 | 740 | 15 | 750 | 15 | 750 |
| Example 27 | 15 | 760 | 15 | 750 | 15 | 740 |
| Com. Example 10 | 15 | 750 | 1.5 | 410 | 0.8 | 250 |
| Com. Example 11 | 15 | 750 | 13 | 740 | 5 | 600 |
| Com. Example 12 | 15 | 740 | 5 | 550 | 1.5 | 300 |
| Com. Example 13 | 15 | 750 | 3 | 520 | 1.2 | 350 |

Examples 28 to 31 and Comparative Examples 14 to 17

There were mixed an ethylene/tetracyclododecene copolymer, an ethylene/propylene copolymer, divinylbenzene and 2,5-dimethyl-2,5-di(tert-butylperoxy)hexene-3, the copolymers having characteristics described below.

The mixing weight proportion was as follows:
ethylene/tetracyclododecene copolymer [I] 80 parts;
ethylene/tetracyclododecene copolymer [II] 10 parts;
ethylene/propylene copolymer 10 parts;
divinylbenzene 0.3 part; and
2,5,-dimethyl-2,5-di(tert-butylperoxy)hexene-3 0.1 part.

Described below are characteristics of ethylene/tetracyclododecene copolymer [I], ethylene/tetracyclododecene copolymer [II], and the ethylene/propylene copolymer.

Characteristics of ethylene/tetracyclododecene copolymer [I]:
Ethylene repeat in unit content: 64 mol %,
Melt flow index (load of 2.16 k9, 260° C.): 35 g/min,
Intrinsic viscosity [$\eta$] (130° C., in decalin): 0.47 dl/g,
and
Softening temperature (TMA): 148° C.

Characteristics of ethylene/tetracyclododecene copolymer [II]:
Ethylene repeating unit content: 85 mol %,
Intrinsic viscosity [$\eta$] (130° C. in decalin): 0.42 dl/g, and
Glass transition temperature (Tg): 0° C.

Characteristics of the ethylene/propylene copolymer:
Ethylene repeating unit content: 80 mol %, and
Melt flow index (load of 2.16 kg, 190° C.): 0.4 g/min.

To a mixture having the above-described composition, were added stabilizers listed in Table 4-1 in amounts described in Table 4-1, and each of the resultant mixture was pelletized by melt kneading at 230° C. by a twin extruder having a screw diameter of 30 mm.

The pellets were injection molded at a cylinder temperature of 270° C. and a mold temperature of 90° C. to produce test pieces.

The thermal aging resistance of the resultant test pieces was evaluated by determining Izod impact resistance and bending strength.

The results are shown in Table 4-2.

TABLE 4-1

|  | Stabilizer (wt. %) | | | | | | | |
|---|---|---|---|---|---|---|---|---|
|  | Phenolic | | | | Sulfur | | Phosphorus | |
|  | B | C | D | E | H | I | J | K |
| Example 28 | 0.1 | — | — | — | 0.1 | — | — | — |
| Example 29 | — | 0.1 | — | — | — | 0.1 | — | — |
| Example 30 | 0.1 | — | — | — | — | — | — | 0.1 |
| Example 31 | 0.1 | — | — | — | — | 0.1 | — | 0.1 |
| Com. Example 14 | — | — | — | — | — | — | — | — |
| Com. Example 15 | 0.1 | — | — | — | — | — | — | — |
| Com. Example 16 | — | — | — | — | — | 0.1 | — | — |
| Com. Example 17 | — | — | — | — | — | — | — | 0.1 |

Note:
In the above table, the amounts of incorporated stabilizers are expressed in terms of parts by weight based on 100 parts by weight of thermoplastic resin.

TABLE 4-2

|  | Initial strength | | Strength after 6 weeks | | Strength after 12 weeks | |
|---|---|---|---|---|---|---|
|  | Izod impact (kg · cm/cm) | Bending (kg/cm²) | Izod impact (kg · cm/cm) | Bending (kg/cm²) | Izod impact (kg · cm/cm) | Bending (kg/cm²) |
| Example 28 | 10 | 800 | 8 | 810 | 7 | 800 |
| Example 29 | 10 | 790 | 8 | 800 | 7 | 810 |
| Example 30 | 10 | 790 | 8 | 800 | 7 | 790 |
| Example 31 | 10 | 800 | 9 | 790 | 8 | 800 |
| Com. Example 14 | 10 | 800 | 1.5 | 350 | 0.8 | 230 |
| Com. Example 15 | 10 | 810 | 7 | 780 | 3 | 650 |
| Com. Example 16 | 10 | 790 | 4 | 650 | 2 | 500 |
| Com. Example 17 | 10 | 800 | 3 | 500 | 1 | 400 |

Examples 32 to 35 and Comparative Examples 18 to 21

There were mixed an ethylene/tetracyclododecnen copolymer, a hydrogenated product of a styrene/butadiene/styrene block copolymer (Kraton G1650, from Shell Chemical Co., Ltd.) and an ethylene/propylene copolymer. The characteristics of the copolymers and the product are described below.

The mixing weight proportion was as follows:
ethylene/tetracyclododecene copolymer 80 parts; ethylene/propylene copolymer 10 parts; and a hydrogenated product of styrene/butadiene/styrene block copolymer (density of 0.91, ethylene/rubber ratio of 28/72, Kraton G1650, from Shell Chemical Co., Ltd.) 10 parts.

Described below are characteristics of the ethylene/-tetracyclododecene copolymer and the ethylene/propylene copolymer.

Characteristics of the ethylene/tetracyclododecene copolymer:
  Ethylene repeating unit content: 64 mol %,
  Melt flow index (load of 2.16 kg, 260° C.): 35 g/min,
  Intrinsic viscosity [η] (130° C., in decalin): 0.47 dl/g, and
  Softening temperature (TMA): 148° C.

Characteristics of the ethylene/propylene copolymer:
  Ethylene repeating unit content: 80 mol %, and
  Melt flow index (load of 2.16 kg, 190° C.): 0.4 g/min.

To a mixture having the above-described composition, stabilizers listed in Table. 5-1 were added in amounts described in Table 5-1, and each of the resultant mixture was pelletized by melt kneading at 230° C. by a twin extruder having a screw diameter of 30 mm.

The pellets were injection molded at a cylinder temperature of 270° C. and a mold temperature of 90° C. to produce test pieces.

The thermal aging resistance of the resultant test pieces was evaluated by determining Izod impact resistance and bending strength.

The results are shown in Table 5-2.

TABLE 5-1

| | Stabilizer (wt. %) | | | | | | |
|---|---|---|---|---|---|---|---|
| | Phenolic | | | | Sulfur | | Phosphorus |
| | B | C | D | E | H | I | J | K |
| Example 32 | 0.1 | — | — | — | 0.1 | — | — | — |
| Example 33 | — | 0.1 | — | — | — | 0.1 | — | — |
| Example 34 | 0.1 | — | — | — | — | — | — | 0.1 |
| Example 35 | 0.1 | — | — | — | — | 0.1 | — | 0.1 |
| Com. Example 18 | — | — | — | — | — | — | — | — |
| Com. Example 19 | 0.1 | — | — | — | — | — | — | — |
| Com. Example 20 | — | — | — | — | — | 0.1 | — | — |
| Com. Example 21 | — | — | — | — | — | — | — | 0.1 |

Note:
In the above table, the amounts of incorporated stabilizers are expressed in terms of parts by weight based on 100 parts by weight of thermoplastic resin.

Described below are characteristics of the ethylene/-tetracyclododecene copolymer and the ethylene/propylene copolymer.

Characteristics of the ethylene/tetracyclododecene copolymer:
  Ethylene repeating unit content: 64 mol %,
  Melt flow index (load of 2.16 kg, 260° C.): 35g/rain,
  Intrinsic viscosity [η] (130° C., in decalin): 0.47 dl/g, and
  Softening temperature (TMA): 148° C.

Characteristics of the ethylene/propylene copolymer:
  Ethylene repeating unit content: 80 mol %, and
  Melt flow index (load of 2.16 kg, 190° C.): 0.4 g/min.

To 100 parts by weight of a mixture having the above-described composition and being prepared as described above was added a mixture of 0.1 part by weight of tetrakis [methylene-3-(3,5-di-tert-butyl-4-hydroxyphenyl)propionate]methane, 0.1 part by weight of tris(2,4-di-tert-butylphenyl) phosphite and 0.1 part by weight of calcium stearate. UV-ray absorbers and hindered amine stabilizers listed in Table 6-1 were added in amounts described in Table 6-1 to the above-described resin mixture. The mixture was pelletized by melt kneading it at 230° C. by a twin extruder having a screw diameter of 30 mm.

Test pieces were prepared by injection molding the pellets at a cylinder temperature of 270° C. and a mold temperature of 90° C.

The weathering resistance of the test pieces was evaluated by determining Izod impact strength and surface brightness (gloss) thereof.

In the present invention, thermal aging resistance of the test pieces was evaluated by allowing them to stand in a xenon weather meter for a predetermined period as described above, and determining Izod impact strength (JIS-K-7100, with a notch), bending strength (JIS-K-7203) and surface brightness (gloss) thereof.

The results are shown in Table 6-2.

TABLE 5-2

| | Initial strength | | Strength after 6 weeks | | Strength after 12 weeks | |
|---|---|---|---|---|---|---|
| | Izod impact (kg · cm/cm) | Bending (kg/cm²) | Izod impact (kg · cm/cm) | Bending (kg/cm²) | Izod impact (kg · cm/cm) | Bending (kg/cm²) |
| Example 32 | 13 | 720 | 13 | 720 | 12 | 720 |
| Example 33 | 13 | 730 | 13 | 720 | 11 | 720 |
| Example 34 | 13 | 720 | 13 | 730 | 10 | 720 |
| Example 35 | 13 | 720 | 13 | 720 | 13 | 730 |
| Com. Example 18 | 13 | 730 | 1.2 | 300 | 0.8 | 200 |
| Com. Example 19 | 13 | 710 | 10 | 710 | 4 | 500 |
| Com. Example 20 | 13 | 720 | 8 | 500 | 2 | 400 |
| Com. Example 21 | 13 | 730 | 6 | 450 | 1.5 | 300 |

Examples 36 to 41 and Comparative Example 22

There were mixed an ethylene/tetracyclododecene copolymer, an ethylene/propylene copolymer, divinylbenzene and 2,5-dimethyl-2,5-di(tert-butylperoxy) hexene-3. The characteristics of the copolymers are described below.

The mixing weight proportion is as follows:
  ethylene/tetracyclododecene copolymer 85 parts;
  ethylene/propylene copolymer 15 parts;
  divinylbenzene 0.3 part; and
  2,5-dimethyl-2,5-di(tert-butylperoxy)hexene-3 0.1 part.

TABLE 6-1

| | Hindered amine stabilizer | UV-Ray absorber | | | |
|---|---|---|---|---|---|
| | M | N | O | P | Q |
| Example 36 | 0.2 | — | — | — | — |
| Example 37 | — | 0.1 | — | — | — |
| Example 38 | — | — | 0.1 | — | — |
| Example 39 | — | — | — | 0.1 | — |
| Example 40 | — | — | — | — | 0.1 |
| Example 41 | 0.1 | — | — | — | 0.1 |
| Com. Example 22 | — | — | — | — | — |

Note:
In the above table, the amounts of incorporated stabilizers are expressed in terms of parts by weight based on 100 parts by weight of thermoplastic resin.

Symbols described in Table 6-1 represent compounds described below.

Hindered amine stabilizer
M: bis(2,2',6,6'-tetramethyl-4-piperidyl) sebacate
UV-ray absorbers
N: N-2-ethoxyphenyl-N'-2-ethoxyphenyloxalic acid amide
O: 2-hydroxy-4-n-octoxybenzophenone
P: 2-(2,-hydroxy-5'-methylphenyl)benzotriazole
Q: 2-(2'-hydroxy-3'-tert-butyl-5'methylphenyl)-5-chlorobenzotriazole

TABLE 6-2

| | Izod impact strength (kg · cm/cm) | | | Gloss | | |
|---|---|---|---|---|---|---|
| | Initial | After 500 hr | After 700 hr | Initial | After 500 hr | After 700 hr |
| Example 36 | 15.1 | 13.3 | 12.5 | 44 | 37 | — |
| Example 37 | 15.2 | 12.5 | 11.0 | 45 | 34 | — |
| Example 38 | 15.0 | 13.0 | 11.5 | 43 | 35 | — |
| Example 39 | 15.3 | 13.8 | 12.0 | 45 | 38 | — |
| Example 40 | 15.1 | 13.7 | 12.1 | 44 | 39 | — |
| Example 41 | 15.0 | 14.5 | 13.8 | 46 | 43 | 35 |
| Com. Example 22 | 15.1 | 8.0 | 5.3 | 45 | 15 | 4 |

Furthermore, the test pieces prepared in Example 41 were additionally allowed to stand for 700 hours, and had gloss of 35, thus showing very good weathering resistance.

Examples 42 to 44 and Comparative Example 23

Example 36 was repeated except that distearyl thiodipropionate in place of tris(2,4-di-tert-butylpheny) phosphite, and UV-ray absorbers and hindered amine stabilizers listed in Table 7-1 were incorporated to produce resin compositions and test pieces. The weathering resistance of the test pieces was evaluated.

The results are shown in Table 7-2.

TABLE 7-1

| | Hindered amine stabilizer M | UV-Ray absorber Q |
|---|---|---|
| Example 42 | 0.1 | — |
| Example 43 | 0.1 | — |
| Example 44 | 0.05 | 0.05 |
| Com. Example 23 | — | — |

Note:
In the above table, the amounts of incorporated stabilizers are expressed in terms of parts by weight based on 100 parts by weight of thermoplastic resin.

TABLE 6-2

| | Izod impact strength (kg · cm/cm) | | | Gloss | | |
|---|---|---|---|---|---|---|
| | Initial | After 500 hr | After 700 hr | Initial | After 500 hr | After 700 hr |
| Example 42 | 15.2 | 13.0 | 12.0 | 46 | 35 | — |
| Example 43 | 15.3 | 13.5 | 13.0 | 44 | 37 | — |
| Example 44 | 15.1 | 14.0 | 13.5 | 45 | 42 | 30 |
| Com. Example 23 | 15.0 | 7.5 | 5.3 | 46 | 13 | 4 |

As described above in detail, the cycloolefin resin compositions according to the present invention prevent deterioration caused by heating during molding owing to the incorporation of specific phenolic stabilizer. It has become therefore possible to manufacture transparent films having excellent appearance.

Moreover, the cycloolefin resin compositions show decreased deterioration and improved thermal deterioration resistance during molding due to the incorporation thereinto of a composite stabilizer prepared from phenolic stabilizers and phosphite stabilizers in combination, or from phenolic stabilizers and thioether stabilizers in combination, compared with the resin compositions into which only one type stabilizers are incorporated. The resin compositions containing such a composite stabilizer show excellent prevention of coloring with the lapse of time as well as effective initial coloring prevention.

Furthermore, by the use of a composite stabilizer prepared from phenolic stabilizers, thioether stabilizers and phosphite stabilizers in combination, the resin compositions of the invention come to have still more excellent coloring-preventive properties, and they also show improved coloring prevention effects with the lapse of time. The resin compositions containing such a composite stabilizer show almost no deterioration and significantly good thermal deterioration-resistant properties during molding.

Still furthermore, the resin compositions have improved weathering resistance by the incorporation of UV-ray absorbers and/or hindered amine stabilizers.

What is claimed is:

1. A cycloolefin resin composition comprising a thermoplastic resin and stabilizer, wherein said thermoplastic resin comprises a cycloolefin random copolymer containing an olefin component and a cycloolefin component represented by the formula (I), (II) or (II-a):

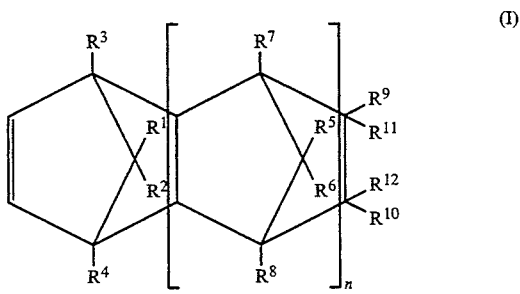

(I)

wherein n is an integer of at least 0, each of $R^1$–$R^{12}$ independently represents a hydrogen atom, a halogen atom or a hydrocarbon group, $R^9$ to $R^{12}$ may be bonded together to form a monocyclic group or a polycyclic group, the monocyclic group or the polycyclic group may have a crosslinking structure and may further have a double bond, and $R^9$ to $R^{12}$ may form a group containing these rings in combination;

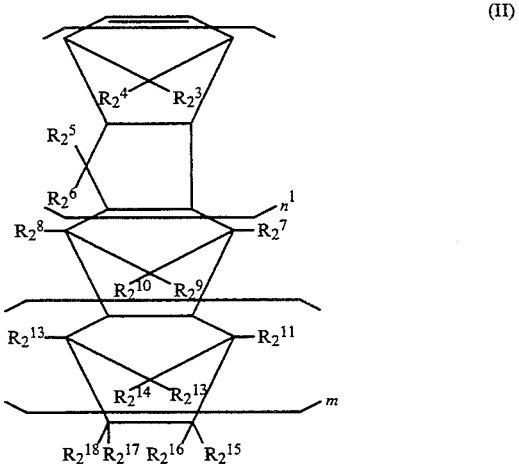

(II)

wherein $n^1$ is 0 or 1, m is an integer of at least 0, $R_2^1$ to $R_2^{18}$ each, independently, represents an atom or a group selected from the group consisting of a hydrogen atom, a halogen atom and a hydrocarbon group, $R_2$ 15 to $R^2$ 18 may be bonded together to form a monocyclic group or a polycyclic group, the monocyclic group or the polycyclic group may have a double bond, and $R^{15}$ and $R^{16}$, or $R^{17}$ and $R^{18}$ may form an alkyldene group;

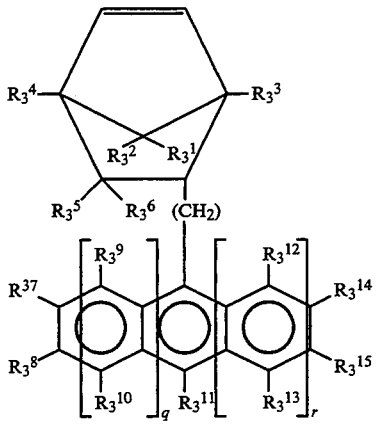

[II-a]

wherein p is an integer of at least 0, q and r are each 0, 1 or 2, each of $R_3^1$ to $R_3^{15}$, independently, represents an atom or a group selected form the group consisting of a hydrogen atom, a halogen atom, an aliphatic hydrocarbon group, an aromatic hydrogen group and an alkoxy group, and $R_3^5$ and $R_3^9$, or $R_3^6$ and $R_3^7$ may be bonded together directly or through an intermediate alkyl group having 1 to 3 carbon atoms, and said stabilizer is selected from the group consisting of (I) (a) 0.01 to 5 parts by weight of a compound having a molecular weight of not more than 600 and being represented by the formula (A):

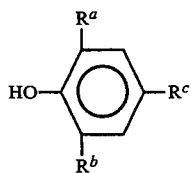

(A)

wherein each of $R^a$ and $R^b$, independently, represents a hydrogen atom or an alkyl group having 1-6 carbon atoms, and $R^c$ represents a group selected from the group consisting of an alkyl group having 1-22 carbon atoms, an alkoxy group having 1-6 carbon atoms and an alkylamino group having 1-6 carbon atoms; and (b) 0.01 to 5 parts by weight of a compound having a molecular weight of not more than 600 and being represented by the formula (B):

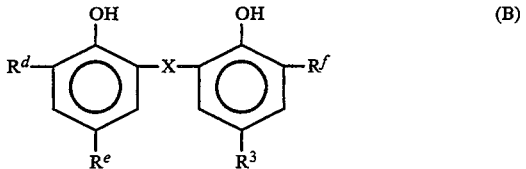

wherein each of $R^d$ and $R^f$, independently, represents an alkyl group having 1-6 carbon atoms, $R^e$ represents an alkyl group having 1-6 carbon atoms or an alkoxy group having 1-6 carbon atoms, and X represents a member selected from the group consisting of an alkylene group, an oxygen atom and a sulfur atom;

(II) (a), (b) and (c) 0.01 to 1 part by weight of a higher aliphatic acid metal salt;

(III) (b) and (d) 0.01 to 5 parts by weight of a compound of formula (C):

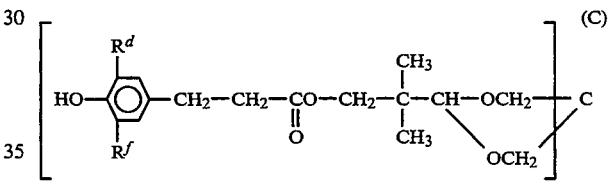

wherein $R^d$ and $R^f$ are as defined above;

wherein the amount of said stabilizers are based on 100 parts by weight of the thermoplastic resin.

2. The cycloolefin resin composition of claim 1 which contains said stabilizer (I).

3. The cycloolefin resin composition of claim 1 which contains said stabilizer (II).

4. The cycloolefin resin composition of claim 1 which contains said stabilizer (III).

5. The cycloolefin resin composition of claim 1 which contains said stabilizer (IV).

* * * * *